US011272203B2

(12) United States Patent
Li et al.

(10) Patent No.: US 11,272,203 B2
(45) Date of Patent: Mar. 8, 2022

(54) METHOD AND APPARATUS FOR VIDEO CODING

(71) Applicant: TENCENT AMERICA LLC, Palo Alto, CA (US)

(72) Inventors: Guichun Li, Milpitas, CA (US); Xiang Li, Saratoga, CA (US); Xiaozhong Xu, State College, PA (US); Shan Liu, San Jose, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 0 days.

(21) Appl. No.: 16/932,937

(22) Filed: Jul. 20, 2020

(65) Prior Publication Data
US 2021/0029370 A1    Jan. 28, 2021

Related U.S. Application Data

(60) Provisional application No. 62/877,718, filed on Jul. 23, 2019.

(51) Int. Cl.
*H04N 19/50* (2014.01)
*H04N 19/82* (2014.01)

(52) U.S. Cl.
CPC .......... *H04N 19/50* (2014.11); *H04N 19/82* (2014.11); *G06K 2209/17* (2013.01)

(58) Field of Classification Search
CPC ...... H04N 19/50; H04N 19/82; H04N 19/573; H04N 19/577; H04N 19/54; H04N 19/513;

(Continued)

(56) References Cited

U.S. PATENT DOCUMENTS

| | | | |
|---|---|---|---|
| 8,259,809 B2 * | 9/2012 | Lin | H04N 19/533 375/240.17 |
| 2004/0252759 A1 * | 12/2004 | John Winder | H04N 19/537 375/240.12 |

(Continued)

OTHER PUBLICATIONS

ITU-T Telecommunication Standardization Section of ITU, "High efficiency video coding", H.265, Series H: Audiovisual and Multimedia Systems Infrastructure of audiovisual series—Coding of moving video, International Telecommunication Union, Dec. 2016 (664 pages).

(Continued)

*Primary Examiner* — Dramos Kalapodas
(74) *Attorney, Agent, or Firm* — Oblon, McClelland, Maier & Neustadt, L.L.P.

(57) ABSTRACT

Aspects of the disclosure provide methods and apparatuses for video encoding/decoding. In some examples, an apparatus for video decoding includes receiving circuitry and processing circuitry. For example, the processing circuitry decodes prediction information of a current block in a current picture from a coded video bitstream. The prediction information is indicative of a prediction mode that uses a first optical flow refinement coding tool. The first optical flow refinement coding tool uses a grid structure that is used additionally by at least a second optical flow refinement coding tool during operations of optical flow refinement. Then, the processing circuitry calculates, using the first optical flow refinement coding tool, refinements to predictions of samples of the current block based on the grid structure, and reconstructs the samples of the current block based on the refinements and the predictions of the samples.

20 Claims, 23 Drawing Sheets

(58) Field of Classification Search
CPC ...... H04N 19/60; H04N 19/91; H04N 19/124; H04N 19/109; H04N 19/14; H04N 19/147; H04N 19/176; H04N 19/184; H04N 19/186; H04N 19/436; H04N 19/523; H04N 19/527; H04N 19/59; H04N 19/80; G06K 2209/17

See application file for complete search history.

(56) References Cited

U.S. PATENT DOCUMENTS

| | | | |
|---|---|---|---|
| 2018/0241998 A1* | 8/2018 | Chen | H04N 19/139 |
| 2018/0262773 A1* | 9/2018 | Chuang | H04N 19/00 |
| 2018/0270480 A1* | 9/2018 | Zhang | H04N 19/86 |
| 2018/0278949 A1* | 9/2018 | Karczewicz | H04N 19/587 |
| 2018/0278950 A1* | 9/2018 | Chen | H04N 19/176 |
| 2018/0316929 A1* | 11/2018 | Li | H04N 19/573 |
| 2019/0014342 A1* | 1/2019 | Li | H04N 19/577 |
| 2019/0124350 A1* | 4/2019 | Thirumalai | H04N 19/56 |
| 2020/0221117 A1* | 7/2020 | Liu | H04N 19/52 |
| 2020/0382795 A1* | 12/2020 | Zhang | H04N 19/50 |
| 2021/0051339 A1* | 2/2021 | Liu | H04N 19/52 |
| 2021/0176472 A1* | 6/2021 | Liu | H04N 19/176 |
| 2021/0195205 A1* | 6/2021 | Liu | H04N 19/105 |
| 2021/0195227 A1* | 6/2021 | Lee | H04N 19/55 |

OTHER PUBLICATIONS

Yusuke Kato et al., "Non-CE9: Simplification of BDOF", Joint Video Exploration Team (JVET) of ITU-T SG 16 WP 3 and ISO/IEC JTC 1/SC 29/WG 11, JVET-O0304-v2, 15th Meeting: Gothenburg, SE, Jul. 3-12, 2019 (6 pages).

Kenneth Andersson et al., "CE5-2.1 and CE5-2.2: Deblocking on 4×4 sample grids", Joint Video Exploration Team (JVET) of ITU-T SG 16 WP 3 and ISO/IEC JTC 1/SC 29/WG 11, JVET-O0060-v2. 15th Meeting: Gothenburg, SE, Jul. 3-12, 2019 (12 pages).

Benjamin Bross et al., "Versatile Video Coding (Draft 5)", Joint Video Exploration Team (JVET) of ITU-T SG 16 WP 3 and ISO/IEC JTC 1/SC 29/WG 11, JVET-N1001-V10, 14th Meeting: Geneva, CH, Mar. 19-27, 2019 (406 pages).

Jiancong (Daniel) Luo et al., "CE2-related: Prediction refinement with optical flow for affine mode" Joint Video Exploration Team (JVET) of ITU-T SG 16 WP 3 and ISO/IEC JTC 1/SC 29/WG 11, JVET-N0236-r5, 14th Meeting: Geneva, CH, Mar. 19-27, 2019 (7 pages).

* cited by examiner

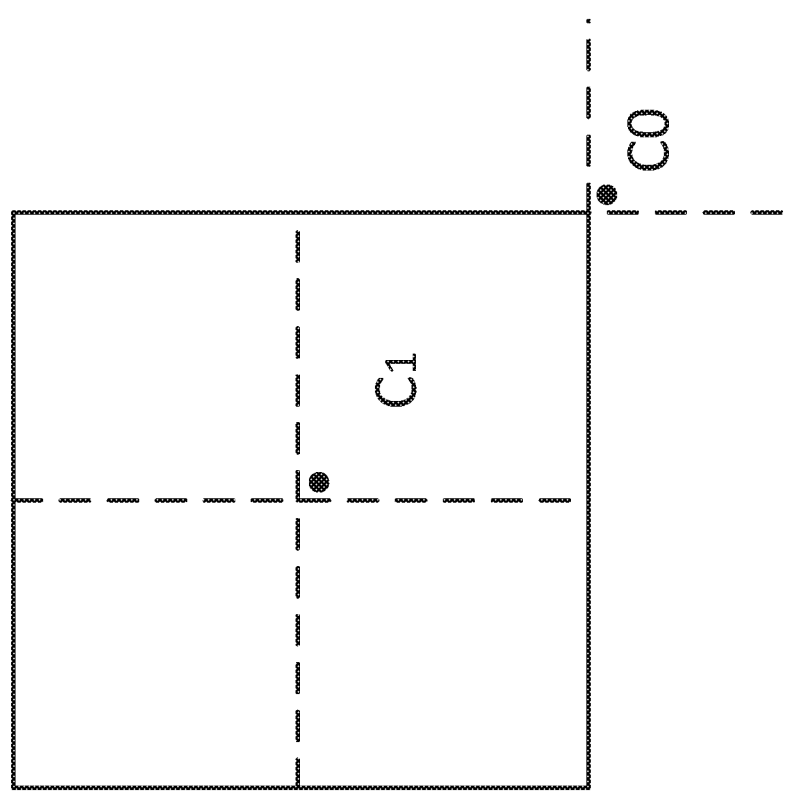

METHOD AND APPARATUS FOR VIDEO CODING

INCORPORATION BY REFERENCE

This present disclosure claims the benefit of priority to U.S. Provisional Application No. 62/877,718, "METHODS ON INTER PREDICTION REFINEMENT, DEBLOCKING AND SUB-BLOCK TRANSFORM" filed on Jul. 23, 2019, which is incorporated by reference herein in its entirety.

TECHNICAL FIELD

The present disclosure describes embodiments generally related to video coding.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Video coding and decoding can be performed using inter-picture prediction with motion compensation. Uncompressed digital video can include a series of pictures, each picture having a spatial dimension of, for example, 1920×1080 luminance samples and associated chrominance samples. The series of pictures can have a fixed or variable picture rate (informally also known as frame rate), of, for example 60 pictures per second or 60 Hz. Uncompressed video has significant bitrate requirements. For example, 1080p604:2:0 video at 8 bit per sample (1920×1080 luminance sample resolution at 60 Hz frame rate) requires close to 1.5 Gbit/s bandwidth. An hour of such video requires more than 600 GBytes of storage space.

One purpose of video coding and decoding can be the reduction of redundancy in the input video signal, through compression. Compression can help reduce the aforementioned bandwidth or storage space requirements, in some cases by two orders of magnitude or more. Both lossless and lossy compression, as well as a combination thereof can be employed. Lossless compression refers to techniques where an exact copy of the original signal can be reconstructed from the compressed original signal. When using lossy compression, the reconstructed signal may not be identical to the original signal, but the distortion between original and reconstructed signals is small enough to make the reconstructed signal useful for the intended application. In the case of video, lossy compression is widely employed. The amount of distortion tolerated depends on the application; for example, users of certain consumer streaming applications may tolerate higher distortion than users of television distribution applications. The compression ratio achievable can reflect that: higher allowable/tolerable distortion can yield higher compression ratios.

Motion compensation can be a lossy compression technique and can relate to techniques where a block of sample data from a previously reconstructed picture or part thereof (reference picture), after being spatially shifted in a direction indicated by a motion vector (MV henceforth), is used for the prediction of a newly reconstructed picture or picture part. In some cases, the reference picture can be the same as the picture currently under reconstruction, MVs can have two dimensions X and Y, or three dimensions, the third being an indication of the reference picture in use (the latter, indirectly, can be a time dimension).

In some video compression techniques, an MV applicable to a certain area of sample data can be predicted from other MVs, for example from those related to another area of sample data spatially adjacent to the area under reconstruction, and preceding that MV in decoding order. Doing so can substantially reduce the amount of data required for coding the MV, thereby removing redundancy and increasing compression. MV prediction can work effectively, for example, because when coding an input video signal derived from a camera (known as natural video) there is a statistical likelihood that areas larger than the area to which a single MV is applicable move in a similar direction and, therefore, can in some cases be predicted using a similar motion vector derived from MVs of neighboring area. That results in the MV found for a given area to be similar or the same as the MV predicted from the surrounding MVs, and that in turn can be represented, after entropy coding, in a smaller number of bits than what would be used if coding the MV directly. In some cases, MV prediction can be an example of lossless compression of a signal (namely: the MVs) derived from the original signal (namely: the sample stream). In other cases, MV prediction itself can be lossy, for example because of rounding errors when calculating a predictor from several surrounding MVs.

Various MV prediction mechanisms are described in H.265/HEVC (ITU-T Rec. H.265, "High Efficiency Video Coding", December 2016). Out of the many MV prediction mechanisms that H.265 offers, described here is a technique henceforth referred to as "spatial merge".

Referring to FIG. 1, a current block (101) comprises samples that have been found by the encoder during the motion search process to be predictable from a previous block of the same size that has been spatially shifted. Instead of coding that MV directly, the MV can be derived from metadata associated with one or more reference pictures, for example from the most recent (in decoding order) reference picture, using the MV associated with either one of five surrounding samples, denoted A0, A1, and B0, B1, B2 (102 through 106, respectively). In H.265, the MV prediction can use predictors from the same reference picture that the neighboring block is using.

SUMMARY

Aspects of the disclosure provide methods and apparatuses for video encoding/decoding. In some examples, an apparatus for video decoding includes receiving circuitry and processing circuitry. For example, the processing circuitry decodes prediction information of a current block in a current picture from a coded video bitstream. The prediction information is indicative of a prediction mode that uses a first optical flow refinement coding tool. The first optical flow refinement coding tool uses a grid structure that is used additionally by at least a second optical flow refinement coding tool during operations of optical flow refinement. Then, the processing circuitry calculates, using the first optical flow refinement coding tool, refinements to predictions of samples of the current block based on the grid structure, and reconstructs the samples of the current block based on the refinements and the predictions of the samples.

In some embodiments, the first optical flow refinement coding tool is one of a bi-directional optical flow (BDOF) based coding tool and an affine prediction refinement with optical flow (PROF) based coding tool, and the second optical flow refinement coding tool is the other of the BDOF based coding tool and the affine PROF based coding tool.

In an embodiment, the processing circuitry applies, according to the first optical flow refinement coding tool, a motion compensation on a sub block having a sub block size, the first optical flow refinement coding tool and the second optical flow refinement coding tool use the sub block size as a unified grid for motion compensations.

In another embodiment, the processing circuitry calculates, according to the first optical flow refinement coding tool, a gradient on a sub block having a sub block size, the first optical flow refinement coding tool and the second optical flow refinement coding tool use the sub block size as a unified grid for gradient calculations.

In another embodiment, the processing circuitry calculates, according to the first optical flow refinement coding tool, refinements to predictions of samples in a sub block having a sub block size, the first optical flow refinement coding tool and the second optical flow refinement coding tool use the sub block size as a unified grid for prediction refinement calculations.

In another embodiment, the processing circuitry calculates, according to the first optical flow refinement coding tool, motion vector refinement per pixel, the first optical flow refinement coding tool and the second optical flow refinement coding tool calculate motion vector refinement per pixel.

In some embodiments, the first optical flow refinement coding tool is an affine prediction refinement with optical flow (PROF) based coding tool, and the processing circuitry reduces a strength of a deblocking filter for applying on at least an internal edge between sub blocks within the current block. In an embodiment, the processing circuitry disables the deblocking, filter for applying on the internal edge between the sub blocks within the current block.

In another embodiment, the processing circuitry compares an indicator parameter that is indicative of a motion vector difference on two sides of the internal edge with a threshold value, and enables/disables the deblocking filter in response to a comparison result.

Aspects of the disclosure also provide a non-transitory computer-readable medium storing instructions which when executed by a computer for video decoding cause the computer to perform the method for video decoding.

BRIEF DESCRIPTION OF THE DRAWINGS

Further features, the nature, and various advantages of the disclosed subject matter will be more apparent from the following detailed description and the accompanying drawings in which:

FIG. 10 shows an example for illustrating the positions for the temporal candidate.

DETAILED DESCRIPTION OF EMBODIMENTS

Figure 2:
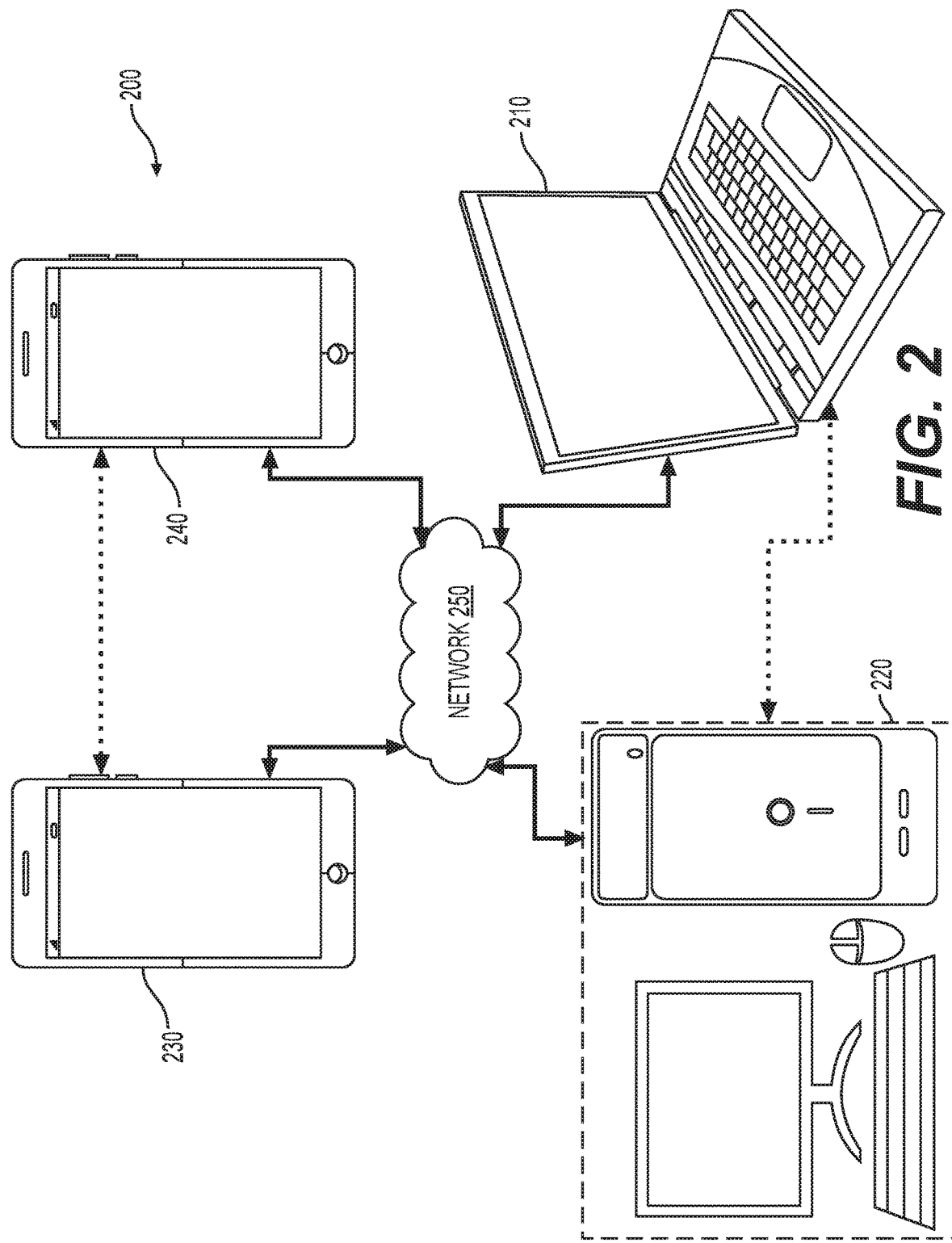
FIG. 2 is a schematic illustration of a simplified block diagram of a communication system (200) in accordance with an embodiment.

FIG. 2 illustrates a simplified block diagram of a communication system (200) according to an embodiment of the present disclosure. The communication system (200) includes a plurality of terminal devices that can communicate with each other, via, for example, a network (250). For example, the communication system (200) includes a first pair of terminal devices (210) and (220) interconnected via the network (250). In the FIG. 2 example, the first pair of terminal devices (210) and (220) performs unidirectional transmission of data. For example, the terminal device (210) may code video data (e.g., a stream of video pictures that are captured by the terminal device (210)) for transmission to the other terminal device (220) via the network (250). The encoded video data can be transmitted in the form of one or more coded video bitstreams. The terminal device (220) may receive the coded video data from the network (250), decode the coded video data to recover the video pictures and display video pictures according to the recovered video data. Unidirectional data transmission may be common in media serving applications and the like.

In another example, the communication system (200) includes a second pair of terminal devices (230) and (240) that performs bidirectional transmission of coded video data that may occur, for example, during videoconferencing. For bidirectional transmission of data, in an example, each terminal device of the terminal devices (230) and (240) may code video data (e.g., a stream of video pictures that are captured by the terminal device) for transmission to the other terminal device of the terminal devices (230) and (240) via the network (250). Each terminal device of the terminal devices (230) and (240) also may receive the coded video data transmitted by the other terminal device of the terminal devices (230) and (240), and may decode the coded video data to recover the video pictures and may display video pictures at an accessible display device according to the recovered video data.

In the FIG. 2 example, the terminal devices (210), (220), (230) and (240) may be illustrated as servers, personal computers and smart phones but the principles of the present disclosure may be not so limited. Embodiments of the present disclosure find application with laptop computers, tablet computers, media players and/or dedicated video conferencing equipment. The network (250) represents any number of networks that convey coded video data among the terminal devices (210), (220), (230) and (240), including for example wireline (wired) and/or wireless communication networks. The communication network (250) may exchange data in circuit-switched and/or packet-switched channels. Representative networks include telecommunications networks, local area networks, wide area networks and/or the Internet. For the purposes of the present discussion, the architecture and topology of the network (250) may be immaterial to the operation of the present disclosure unless explained herein below.

Figure 3:
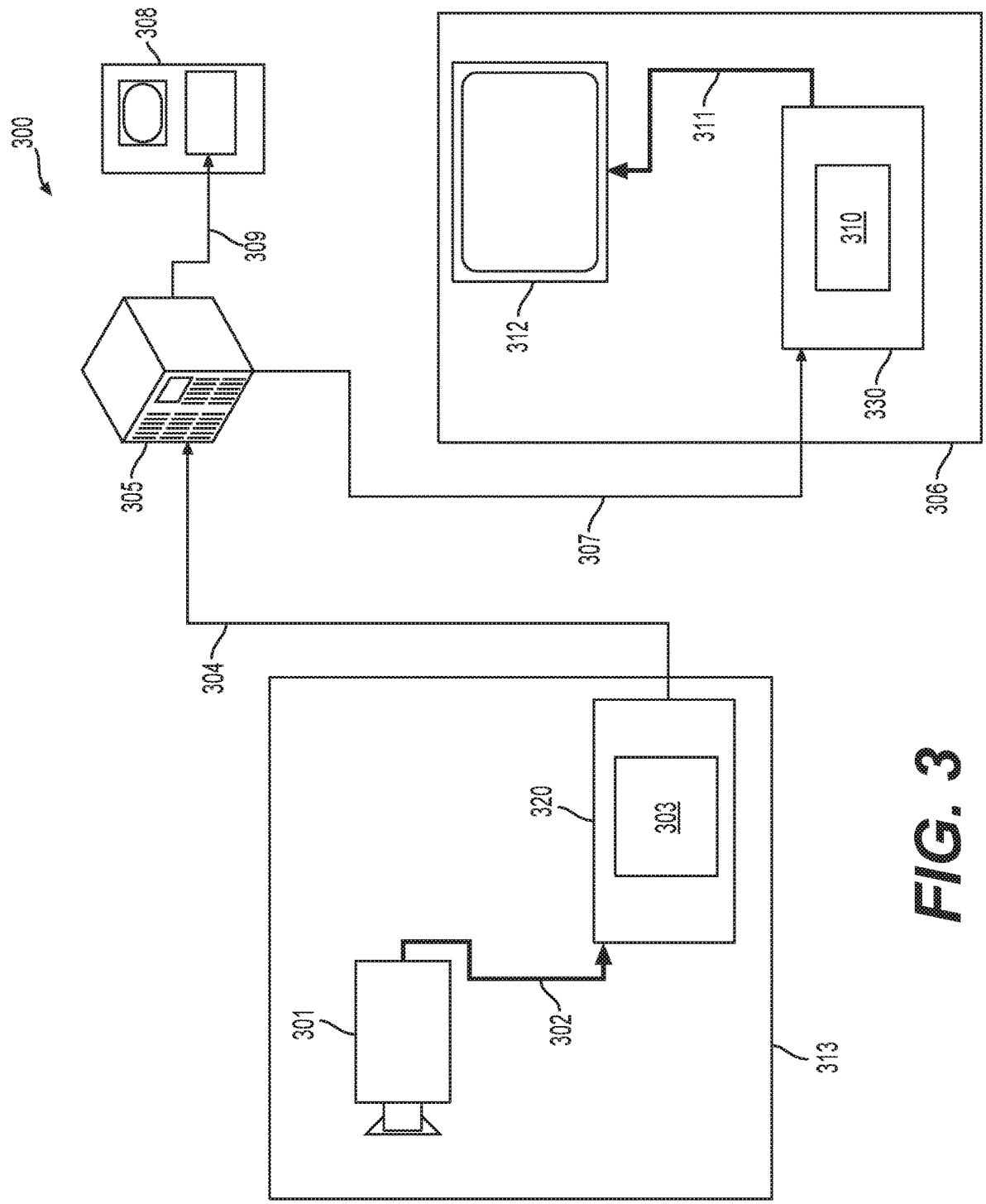
FIG. 3 is a schematic illustration of a simplified block diagram of a communication system (300) in accordance with an embodiment.

FIG. 3 illustrates, as an example for an application for the disclosed subject matter, the placement of a video encoder and a video decoder in a streaming environment. The disclosed subject matter can be equally applicable to other video enabled applications, including, for example, video conferencing, digital TV, storing of compressed video on digital media including CD, DVD, memory stick and the like, and so on.

A streaming system may include a capture subsystem (313), that can include a video source (301), for example a digital camera, creating for example a stream of video pictures (302) that are uncompressed. In an example, the stream of video pictures (302) includes samples that are taken by the digital camera. The stream of video pictures (302), depicted as a bold line to emphasize a high data volume when compared to encoded video data (304) (or coded video bitstreams), can be processed by an electronic device (320) that includes a video encoder (303) coupled to the video source (301). The video encoder (303) can include hardware, software, or a combination thereof to enable or implement aspects of the disclosed subject matter as described in more detail below. The encoded video data (304) (or encoded video bitstream (304)), depicted as a thin line to emphasize the lower data volume when compared to the stream of video pictures (302), can be stored on a streaming server (305) for future use. One or more streaming client subsystems, such as client subsystems (306) and (308) in FIG. 3 can access the streaming server (305) to retrieve copies (307) and (309) of the encoded video data (304). A client subsystem (306) can include a video decoder (310), for example, in an electronic device (330). The video decoder (310) decodes the incoming copy (307) of the encoded video data and creates an outgoing stream of video pictures (311) that can be rendered on a display (312) (e.g., display screen) or other rendering device (not depicted). In some streaming systems, the encoded video data (304), (307), and (309) (e.g., video bitstreams) can be encoded according to certain video coding/compression standards. Examples of those standards include ITU-T Recommendation H.265. In an example, a video coding standard under development is informally known as Versatile Video Coding (VVC). The disclosed subject matter may be used in the context VVC.

It is noted that the electronic devices (320) and (330) can include other components (not shown). For example, the electronic device (320) can include a video decoder (not shown) and the electronic device (330) can include a video encoder (not shown) as well.

Figure 4:
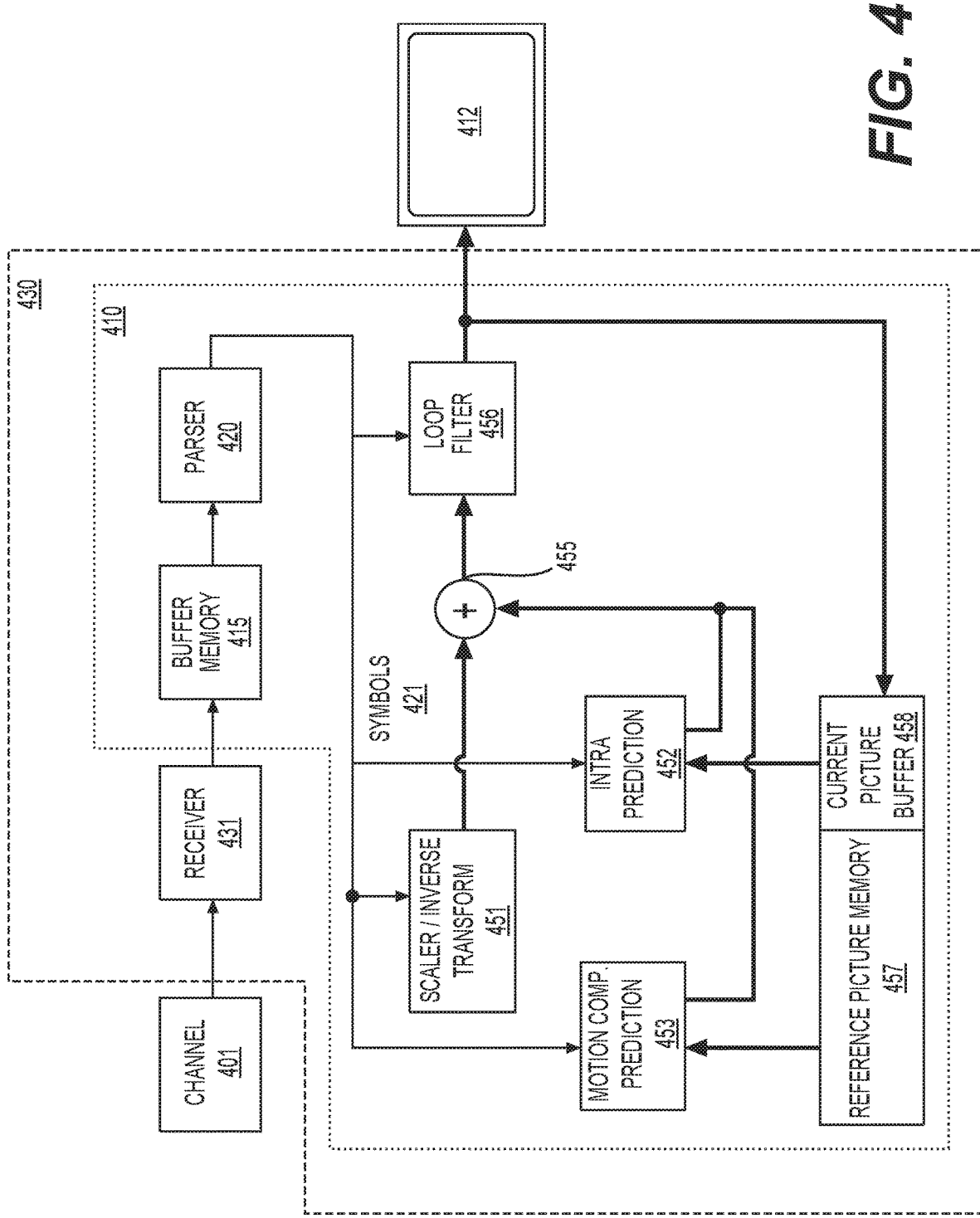
FIG. 4 is a schematic illustration of a simplified block diagram of a decoder in accordance with an embodiment.

FIG. 4 shows a block diagram of a video decoder (410) according to an embodiment of the present disclosure. The video decoder (410) can be included in an electronic device (430). The electronic device (430) can include a receiver (431) (e.g., receiving circuitry). The video decoder (410) can be used in the place of the video decoder (310) in the FIG. 3 example.

The receiver (431) may receive one or more coded video sequences to be decoded by the video decoder (410); in the same or another embodiment, one coded video sequence at a time, where the decoding of each coded video sequence is independent from other coded video sequences. The coded video sequence may be received from a channel (401), which may be a hardware/software link to a storage device which stores the encoded video data. The receiver (431) may receive the encoded video data with other data, for example, coded audio data and/or ancillary data streams, that may be forwarded to their respective using entities (not depicted). The receiver (431) may separate the coded video sequence from the other data. To combat network jitter, a buffer memory (415) may be coupled in between the receiver (431) and an entropy decoder/parser (420) ("parser (420)" henceforth). In certain applications, the buffer memory (415) is part of the video decoder (410). In others, it can be outside of the video decoder (410) (not depicted). In still others, there can be a buffer memory (not depicted) outside of the video decoder (410), for example to combat network jitter, and in addition another buffer memory (415) inside the video decoder (410), for example to handle playout timing. When the receiver (431) is receiving data from a store/forward device of sufficient bandwidth and controllability, or from an isosynchronous network, the buffer memory (415) may not be needed, or can be small. For use on best effort packet networks such as the Internet, the buffer memory (415) may be required, can be comparatively large and can be advantageously of adaptive size, and may at least partially be implemented in an operating system or similar elements (not depicted) outside of the video decoder (410).

The video decoder (410) may include the parser (420) to reconstruct symbols (421) from the coded video sequence. Categories of those symbols include information used to manage operation of the video decoder (410), and potentially information to control a rendering device such as a render device (412) (e.g., a display screen) that is not an integral part of the electronic device (430) but can be coupled to the electronic device (430), as was shown in FIG. 4. The control information for the rendering devices) may be in the form of Supplemental Enhancement Information (SEI messages) or Video Usability Information (VUI) parameter set fragments (not depicted). The parser (420) may parse/entropy-decode the coded video sequence that is received. The coding of the coded video sequence can be in accordance with a video coding technology or standard, and can follow various principles, including variable length coding, Huffman coding, arithmetic coding with or without context sensitivity, and so forth. The parser (420) may extract from the coded video sequence, a set of subgroup parameters for at least one of the subgroups of pixels in the video decoder, based upon at least one parameter corresponding to the group. Subgroups can include Groups of Pictures (GOPs), pictures, tiles, slices, macroblocks, Coding Units (CUs), blocks, Transform Units (TUs), Prediction Units (PUs) and so forth. The parser (420) may also extract from the coded video sequence information such as transform coefficients, quantizer parameter values, motion vectors, and so forth.

The parser (420) may perform an entropy decoding/parsing operation on the video sequence received from the buffer memory (415), so as to create symbols (421).

Reconstruction of the symbols (421) can involve multiple different units depending on the type of the coded video picture or parts thereof (such as: inter and intra picture, inter and intra block), and other factors. Which units are involved, and how, can be controlled by the subgroup control information that was parsed from the coded video sequence by the parser (420). The flow of such subgroup control information between the parser (420) and the multiple units below is not depicted for clarity.

Beyond the functional blocks already mentioned, the video decoder (410) can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is appropriate.

A first unit is the scaler/inverse transform unit (451). The scaler/inverse transform unit (451) receives a quantized transform coefficient as well as control information, including which transform to use, block size, quantization factor, quantization scaling matrices, etc. as symbol(s) (421) from the parser (420). The scaler/inverse transform unit (451) can output blocks comprising sample values, that can be input into aggregator (455).

In some cases, the output samples of the scaler/inverse transform (451) can pertain to an intra coded block; that is: a block that is not using predictive information from previously reconstructed pictures, but can use predictive information from previously reconstructed parts of the current picture. Such predictive information can be provided by an intra picture prediction unit (452). In some cases, the intra picture prediction unit (452) generates a block of the same size and shape of the block under reconstruction, using surrounding already reconstructed information fetched from the current picture buffer (458). The current picture buffer (458) buffers, for example, partly reconstructed current picture and/or fully reconstructed current picture. The aggregator (455), in some cases, adds, on a per sample basis, the prediction information the intra prediction unit (452) has generated to the output sample information as provided by the scaler/inverse transform unit (451).

In other cases, the output samples of the scaler/inverse transform unit (451) can pertain to an inter coded, and potentially motion compensated block. In such a case, a motion compensation prediction unit (453) can access reference picture memory (457) to fetch samples used for prediction. After motion compensating the fetched samples in accordance with the symbols (421) pertaining to the block, these samples can be added by the aggregator (455) to the output of the scaler/inverse transform unit (451) (in this case called the residual samples or residual signal) so as to generate output sample information. The addresses within the reference picture memory (457) from where the motion compensation prediction unit (453) fetches prediction samples can be controlled by motion vectors, available to the motion compensation prediction unit (453) in the form of symbols (421) that can have, for example X, Y, and reference picture components. Motion compensation also can include interpolation of sample values as fetched from the reference picture memory (457) when sub-sample exact motion vectors are in use, motion vector prediction mechanisms, and so forth.

The output samples of the aggregator (455) can be subject to various loop filtering techniques in the loop filter unit (456). Video compression technologies can include in-loop filter technologies that are controlled by parameters included in the coded video sequence (also referred to as coded video bitstream) and made available to the loop filter unit (456) as symbols (421) from the parser (420), but can also be responsive to meta-information obtained during the decoding of previous (in decoding order) parts of the coded picture or coded video sequence, as well as responsive to previously reconstructed and loop-filtered sample values.

The output of the loop filter unit (456) can be a sample stream that can be output to the render device (412) as well as stored in the reference picture memory (457) for use in future inter-picture prediction.

Certain coded pictures, once fully reconstructed, can be used as reference pictures for future prediction. For example, once a coded picture corresponding to a current picture is fully reconstructed and the coded picture has been identified as a reference picture (by, for example, the parser (420)), the current picture buffer (458) can become a part of the reference picture memory (457), and a fresh current picture buffer can be reallocated before commencing the reconstruction of the following coded picture.

The video decoder (410) may perform decoding operations according to a predetermined video compression technology in a standard, such as Rec. H.265. The coded video sequence may conform to a syntax specified by the video compression technology or standard being used, in the sense that the coded video sequence adheres to both the syntax of the video compression technology or standard and the profiles as documented in the video compression technology or standard. Specifically, a profile can select certain tools as the only tools available for use under that profile from all the tools available in the video compression technology or standard. Also necessary for compliance can be that the complexity of the coded video sequence is within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

In an embodiment, the receiver (431) may receive additional (redundant) data with the encoded video. The additional data may be included as part of the coded video sequence(s). The additional data may be used by the video decoder (410) to properly decode the data and/or to more accurately reconstruct the original video data. Additional data can be in the form of, for example, temporal, spatial, or signal noise ratio (SNR) enhancement layers, redundant slices, redundant pictures, forward error correction codes, and so on.

Figure 5:
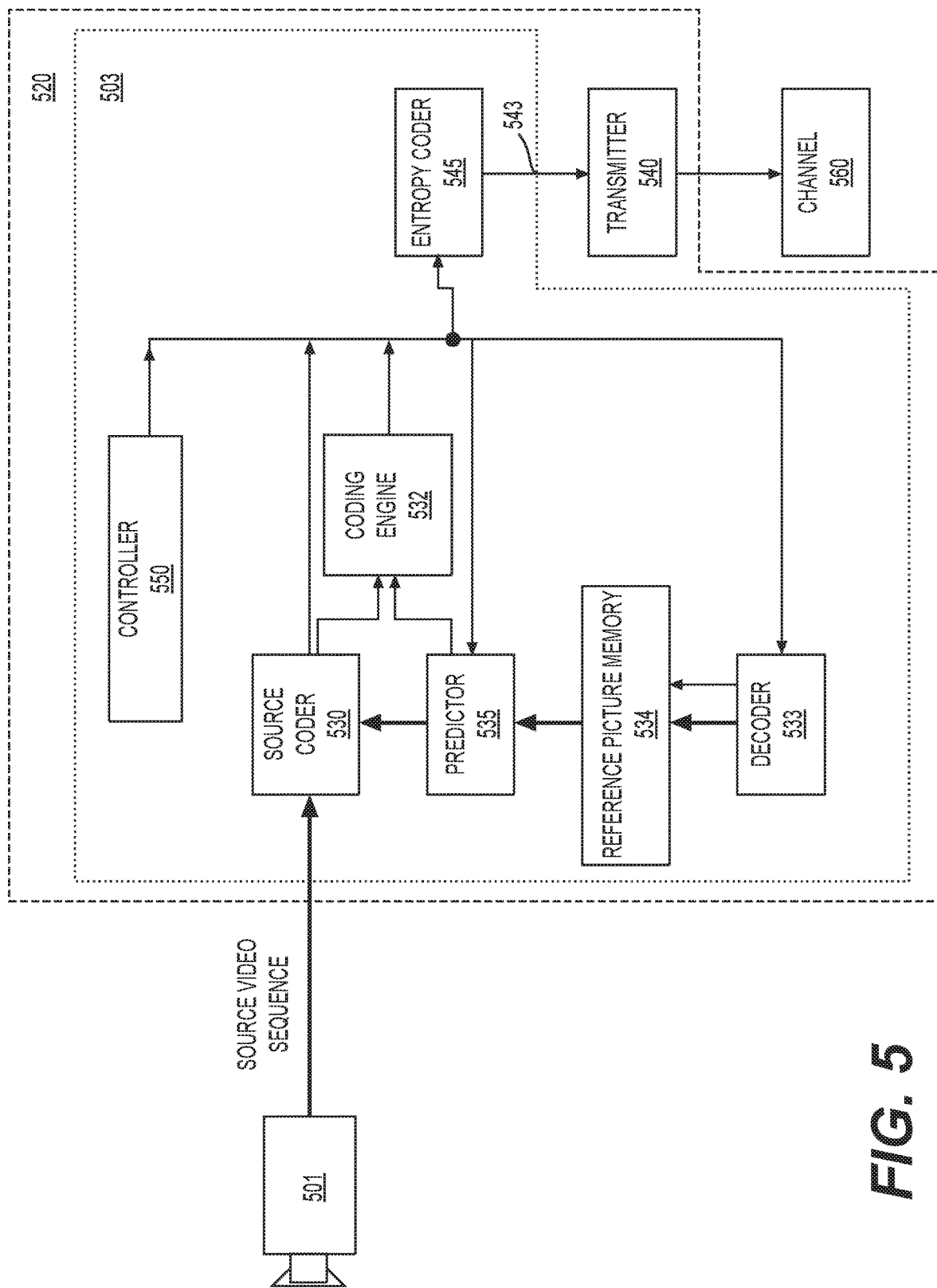
FIG. 5 is a schematic illustration of a simplified block diagram of an encoder in accordance with an embodiment.

FIG. 5 shows a block diagram of a video encoder (503) according to an embodiment of the present disclosure. The video encoder (503) is included in an electronic device (520). The electronic device (520) includes a transmitter (540) (e.g., transmitting circuitry). The video encoder (503) can be used in the place of the video encoder (303) in the FIG. 3 example.

The video encoder (503) may receive video samples from a video source (501) (that is not part of the electronic device (520) in the FIG. 5 example) that may capture video image(s) to be coded by the video encoder (503). In another example, the video source (501) is a part of the electronic device (520).

The video source (501) may provide the source video sequence to be coded by the video encoder (503) in the form of a digital video sample stream that can be of any suitable bit depth (for example: 8 bit, 10 bit, 12 bit, . . . ), any colorspace (for example, BT.601 Y CrCB, RGB, . . . ), and any suitable sampling structure (for example Y CrCb 4:2:0, Y CrCb 4:4:4). In a media serving system, the video source (501) may be a storage device storing previously prepared video. In a videoconferencing system, the video source (501) may be a camera that captures local image information as a video sequence. Video data may be provided as a plurality of individual pictures that impart motion when viewed in sequence. The pictures themselves may be organized as a spatial array of pixels, wherein each pixel can comprise one or more samples depending on the sampling structure, color space, etc. in use. A person skilled in the art can readily understand the relationship between pixels and samples. The description below focuses on samples.

According to an embodiment, the video encoder (503) may code and compress the pictures of the source video sequence into a coded video sequence (543) in real time or under any other time constraints as required by the application. Enforcing appropriate coding speed is one function of a controller (550). In some embodiments, the controller (550) controls other functional units as described below and is functionally coupled to the other functional units. The coupling is not depicted for clarity. Parameters set by the controller (550) can include rate control related parameters (picture skip, quantizer, lambda value of rate-distortion optimization techniques, . . . ), picture size, group of pictures (GOP) layout, maximum motion vector search range, and so forth. The controller (550) can be configured to have other suitable functions that pertain to the video encoder (503) optimized for a certain system design.

In some embodiments, the video encoder (503) is configured to operate in a coding loop. As an oversimplified description, in an example, the coding loop can include a source coder (530) (e.g., responsible for creating symbols, such as a symbol stream, based on an input picture to be coded, and a reference picture(s)), and a (local) decoder (533) embedded in the video encoder (503). The decoder (533) reconstructs the symbols to create the sample data in a similar manner as a (remote) decoder also would create (as any compression between symbols and coded video bitstream is lossless in the video compression technologies considered in the disclosed subject matter). The reconstructed sample stream (sample data) is input to the reference picture memory (534). As the decoding of a symbol stream leads to bit-exact results independent of decoder location (local or remote), the content in the reference picture memory (534) is also bit exact between the local encoder and remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is used in some related arts as well.

The operation of the "local" decoder (533) can be the same as of a "remote" decoder, such as the video decoder (410), which has already been described in detail above in conjunction with FIG. 4. Briefly referring also to FIG. 4, however, as symbols are available and encoding/decoding of symbols to a coded video sequence by an entropy coder (545) and the parser (420) can be lossless, the entropy decoding parts of the video decoder (410), including the buffer memory (415), and parser (420) may not be fully implemented in the local decoder (533).

An observation that can be made at this point is that any decoder technology except the parsing/entropy decoding that is present in a decoder also necessarily needs to be present, in substantially identical functional form, in a corresponding encoder. For this reason, the disclosed subject matter focuses on decoder operation. The description of encoder technologies can be abbreviated as they are the inverse of the comprehensively described decoder technologies. Only in certain areas a more detail description is required and provided below.

During operation, in some examples, the source coder (530) may perform motion compensated predictive coding, which codes an input picture predictively with reference to one or more previously coded picture from the video sequence that were designated as "reference pictures." In this manner, the coding engine (532) codes differences between pixel blocks of an input picture and pixel blocks of reference picture(s) that may be selected as prediction reference(s) to the input picture.

The local video decoder (533) may decode coded video data of pictures that may be designated as reference pictures, based on symbols created by the source coder (530). Operations of the coding engine (532) may advantageously be lossy processes. When the coded video data may be decoded at a video decoder (not shown in FIG. 5), the reconstructed video sequence typically may be a replica of the source video sequence with some errors. The local video decoder (533) replicates decoding processes that may be performed by the video decoder on reference pictures and may cause reconstructed reference pictures to be stored in the reference picture cache (534). In this manner, the video encoder (503) may store copies of reconstructed reference pictures locally that have common content as the reconstructed reference pictures that will be obtained by a far-end video decoder (absent transmission errors).

The predictor (535) may perform prediction searches for the coding engine (532). That is, for a new picture to be coded, the predictor (535) may search the reference picture memory (534) for sample data (as candidate reference pixel blocks) or certain metadata such as reference picture motion vectors, block shapes, and so on, that may serve as an appropriate prediction reference for the new pictures. The predictor (535) may operate on a sample block-by-pixel block basis to find appropriate prediction references. In some cases, as determined by search results obtained by the predictor (535), an input picture may have prediction references drawn from multiple reference pictures stored in the reference picture memory (534).

The controller (550) may manage coding operations of the source coder (530), including, for example, setting of parameters and subgroup parameters used for encoding the video data.

Output of all aforementioned functional units may be subjected to entropy coding in the entropy coder (545). The entropy coder (545) translates the symbols as generated by the various functional units into a coded video sequence, by lossless compressing the symbols according to technologies such as Huffman coding, variable length coding, arithmetic coding, and so forth.

The transmitter (540) may buffer the coded video sequence(s) as created by the entropy coder (545) to prepare for transmission via a communication channel (560), which may be a hardware/software link to a storage device which would store the encoded video data. The transmitter (540) may merge coded video data from the video coder (503) with other data to be transmitted, for example, coded audio data and/or ancillary data streams (sources not shown).

The controller (550) may manage operation of the video encoder (503). During coding, the controller (550) may assign to each coded picture a certain coded picture type, which may affect the coding techniques that may be applied to the respective picture. For example, pictures often may be assigned as one of the following picture types:

An Intra Picture (I picture) may be one that may be coded and decoded without using any other picture in the sequence as a source of prediction. Some video codecs allow for different types of intra pictures, including, for example Independent Decoder Refresh ("IDR") Pictures. A person skilled in the art is aware of those variants of I pictures and their respective applications and features.

A predictive picture (P picture) may be one that may be coded and decoded using intra prediction or inter prediction using at most one motion vector and reference index to predict the sample values of each block.

A bi-directionally predictive picture (B Picture) may be one that may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis: Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded predictively, via spatial prediction or via temporal prediction with reference to one previously coded reference picture. Blocks of B pictures may be coded predictively, via spatial prediction or via temporal prediction with reference to one or two previously coded reference pictures.

The video encoder (503) may perform coding operations according to a predetermined video coding technology or standard, such as ITU-T Rec. H.265. In its operation, the video encoder (503) may perform various compression operations, including predictive coding operations that exploit temporal and spatial redundancies in the input video sequence. The coded video data, therefore, may conform to a syntax specified by the video coding technology or standard being used.

In an embodiment, the transmitter (540) may transmit additional data with the encoded video. The source coder (530) may include such data as part of the coded video sequence. Additional data may comprise temporal/spatial/SNR. enhancement layers, other forms of redundant data such as redundant pictures and slices, SEI messages, VUI parameter set fragments, and so on.

A video may be captured as a plurality of source pictures (video pictures) in a temporal sequence. Intra-picture prediction (often abbreviated to intra prediction) makes use of spatial correlation in a given picture, and inter-picture prediction makes uses of the (temporal or other) correlation between the pictures. In an example, a specific picture under encoding/decoding, which is referred to as a current picture, is partitioned into blocks. When a block in the current picture is similar to a reference block in a previously coded and still buffered reference picture in the video, the block in the current picture can be coded by a vector that is referred to as a motion vector. The motion vector points to the reference block in the reference picture, and can have a third dimension identifying the reference picture, in case multiple reference pictures are in use.

In some embodiments, a bi-prediction technique can be used in the inter-picture prediction. According to the bi-prediction technique, two reference pictures, such as a first reference picture and a second reference picture that are both prior in decoding order to the current picture in the video (but may be in the past and future, respectively, in display order) are used. A block in the current picture can be coded by a first motion vector that points to a first reference block in the first reference picture, and a second motion vector that points to a second reference block in the second reference picture. The block can be predicted by a combination of the first reference block and the second reference block.

Further, a merge mode technique can be used in the inter-picture prediction to improve coding efficiency.

According to some embodiments of the disclosure, predictions, such as inter-picture predictions and intra-picture predictions are performed in the unit of blocks. For example, according to the HEVC, standard, a picture in a sequence of video pictures is partitioned into coding tree units (CTU) for compression, the CTUs in a picture have the same size, such as 64×64 pixels, 32×32 pixels, or 16×16 pixels. In general, a CTU includes three coding tree blocks (CTBs), which are one luma CTB and two chroma CTBs. Each CTU can be recursively quadtree split into one or multiple coding units (CUs). For example, a CTU of 64×64 pixels can be split into one CU of 64×64 pixels, or 4 CUs of 32×32 pixels, or 16 CUs of 16×16 pixels. In an example, each CU is analyzed to determine a prediction type for the CU, such as an inter prediction type or an intra prediction type. The CU is split into one or more prediction units (PUs) depending on the temporal and/or spatial predictability. Generally, each PU includes a luma prediction block (PB), and two chroma PBs. In an embodiment, a prediction operation in coding (encoding/decoding) is performed in the unit of a prediction block. Using a luma prediction block as an example of a prediction block, the prediction block includes a matrix of values (e.g., luma values) for pixels, such as 8×8 pixels, 16×16 pixels, 8×16 pixels, 16×8 pixels, and the like.

Figure 6:
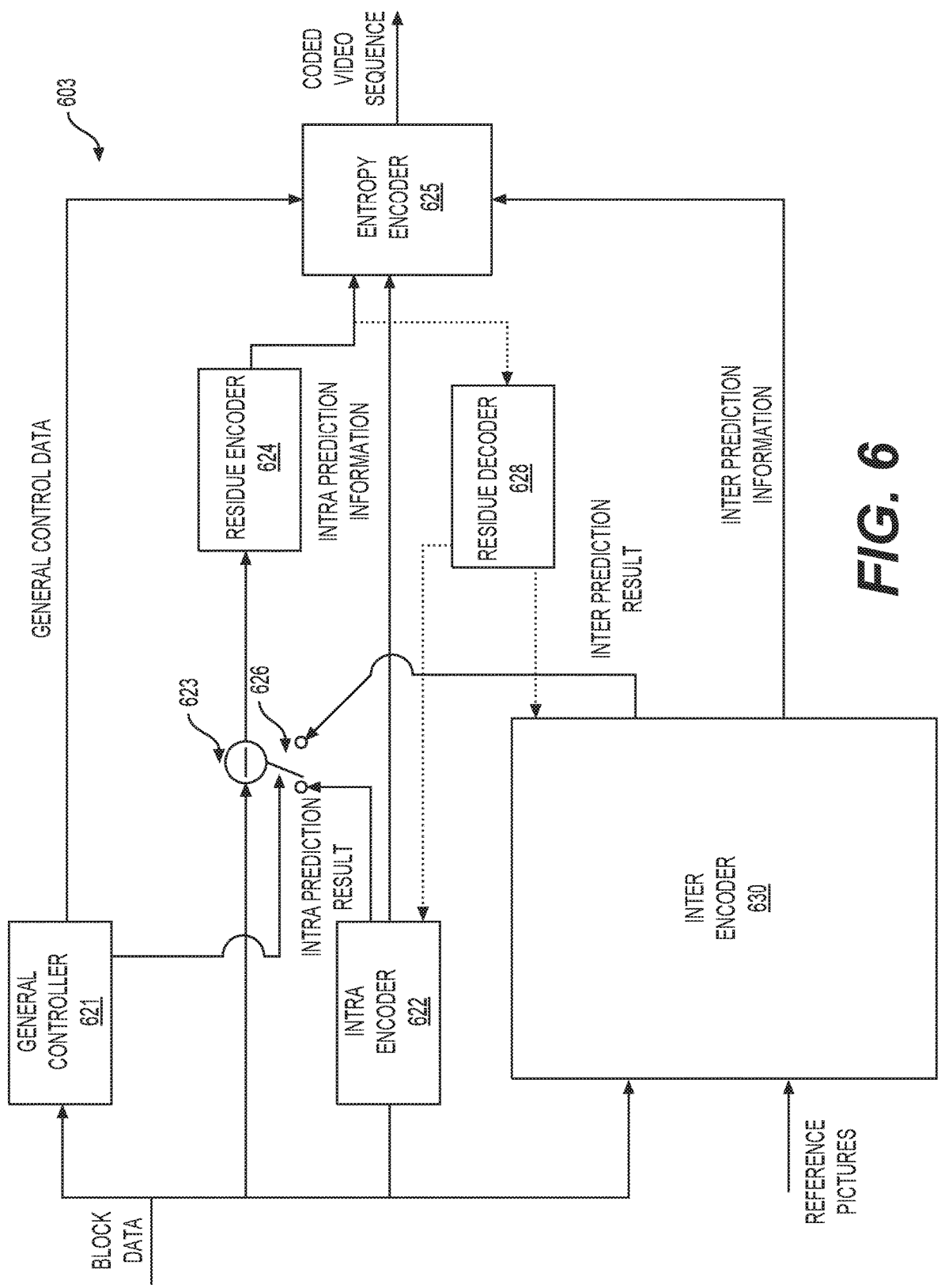
FIG. 6 shows a block diagram of an encoder in accordance with another embodiment.

FIG. 6 shows a diagram of a video encoder (603) according to another embodiment of the disclosure. The video encoder (603) is configured to receive a processing block (e.g., a prediction block) of sample values within a current video picture in a sequence of video pictures, and encode the processing block into a coded picture that is part of a coded video sequence. In an example, the video encoder (603) is used in the place of the video encoder (303) in the FIG. 3 example.

In an HEVC example, the video encoder (603) receives a matrix of sample values for a processing block, such as a prediction block of 8×8 samples, and the like. The video encoder (603) determines whether the processing block is best coded using intra mode, inter mode, or bi-prediction mode using, for example, rate-distortion optimization. When the processing block is to be coded in intra mode, the video encoder (603) may use an intra prediction technique to encode the processing block into the coded picture; and when the processing block is to be coded in inter mode or bi-prediction mode, the video encoder (603) may use an inter prediction or bi-prediction technique, respectively, to encode the processing block into the coded picture. In certain video coding technologies, merge mode can be an inter picture prediction submode where the motion vector is derived from one or more motion vector predictors without the benefit of a coded motion vector component outside the predictors. In certain other video coding technologies, a motion vector component applicable to the subject block may be present. In an example, the video encoder (603) includes other components, such as a mode decision module (not shown) to determine the mode of the processing blocks.

In the FIG. 6 example, the video encoder (603) includes the inter encoder (630), an intra encoder (622), a residue calculator (623), a switch (626), a residue encoder (624), a general controller (621), and an entropy encoder (625) coupled together as shown in FIG. 6.

The inter encoder (630) is configured to receive the samples of the current block (e.g., a processing block), compare the block to one or more reference blocks in reference pictures (e.g., blocks in previous pictures and later pictures), generate inter prediction information (e.g., description of redundant information according to inter encoding technique, motion vectors, merge mode information), and calculate inter prediction results (e.g., predicted block) based on the inter prediction information using any suitable technique. In some examples, the reference pictures are decoded reference pictures that are decoded based on the encoded video information.

The intra encoder (622) is configured to receive the samples of the current block (e.g., a processing block), in some cases compare the block to blocks already coded in the same picture, generate quantized coefficients after transform, and in some cases also intra prediction information (e.g., an intra prediction direction information according to one or more intra encoding techniques). In an example, the intra encoder (622) also calculates intra prediction results (e.g., predicted block) based on the intra prediction information and reference blocks in the same picture.

The general controller (621) is configured to determine general control data and control other components of the video encoder (603) based on the general control data. In an example, the general controller (621) determines the mode of the block, and provides a control signal to the switch (626) based on the mode. For example, when the mode is the intra mode, the general controller (621) controls the switch (626) to select the intra mode result for use by the residue calculator (623), and controls the entropy encoder (625) to select the intra prediction information and include the intra prediction information in the bitstream; and when the mode is the inter mode, the general controller (621) controls the switch (626) to select the inter prediction result for use by the residue calculator (623), and controls the entropy encoder (625) to select the inter prediction information and include the inter prediction information in the bitstream.

The residue calculator (623) is configured to calculate a difference (residue data) between the received block and prediction results selected from the intra encoder (62 or the inter encoder (630). The residue encoder (624) is configured to operate based on the residue data to encode the residue data to generate the transform coefficients. In an example, the residue encoder (624) is configured to convert the residue data from a spatial domain to a frequency domain, and generate the transform coefficients. The transform coefficients are then subject to quantization processing to obtain quantized transform coefficients. In various embodiments, the video encoder (603) also includes a residue decoder (628). The residue decoder (628) is configured to perform inverse-transform, and generate the decoded residue data. The decoded residue data can be suitably used by the intra encoder (622) and the inter encoder (630). For example, the inter encoder (630) can generate decoded blocks based on the decoded residue data and inter prediction information, and the intra encoder (622) can generate decoded blocks based on the decoded residue data and the intra prediction information. The decoded blocks are suitably processed to generate decoded pictures and the decoded pictures can be buffered in a memory circuit (not shown) and used as reference pictures in some examples.

The entropy encoder (625) is configured to format the bitstream to include the encoded block. The entropy encoder (625) is configured to include various information according to a suitable standard, such as the HEVC standard. In an example, the entropy encoder (625) is configured to include the general control data, the selected prediction information (e.g., intra prediction information or inter prediction information), the residue information, and other suitable information in the bitstream. Note that, according to the disclosed subject matter, when coding a block in the merge submode of either inter mode or bi-prediction mode, there is no residue information.

Figure 7:
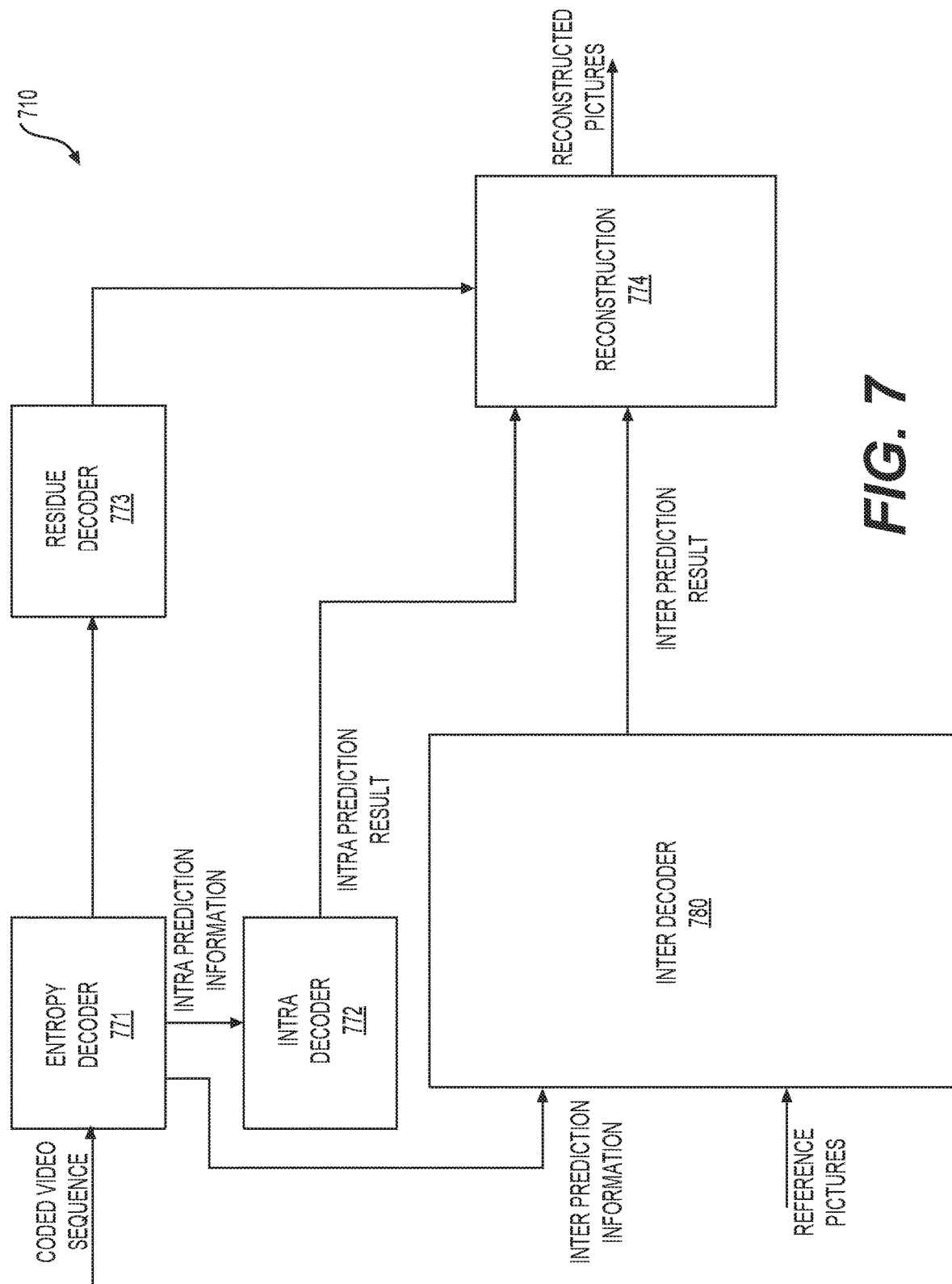
FIG. 7 shows a block diagram of a decoder in accordance with another embodiment.

FIG. 7 shows a diagram of a video decoder (710) according to another embodiment of the disclosure. The video decoder (710) is configured to receive coded pictures that are part of a coded video sequence, and decode the coded pictures to generate reconstructed pictures. In an example, the video decoder (710) is used in the place of the video decoder (310) in the FIG. 3 example.

In the FIG. 7 example, the video decoder (710) includes an entropy decoder (771), an inter decoder (780), a residue decoder (773), a reconstruction module (774), and an intra decoder (772) coupled together as shown in FIG. 7.

The entropy decoder (771) can be configured to reconstruct, from the coded picture, certain symbols that represent the syntax elements of which the coded picture is made up. Such symbols can include, for example, the mode in which a block is coded (such as, for example, intra mode, inter mode, bi-predicted mode, the latter two in merge submode or another submode), prediction information (such as, for example, intra prediction information or inter prediction information) that can identify certain sample or metadata that is used for prediction by the intra decoder (772) or the inter decoder (780), respectively, residual information in the form of, for example, quantized transform coefficients, and the like. In an example, when the prediction mode is inter or bi-predicted mode, the inter prediction information is provided to the inter decoder (780); and when the prediction type is the intra prediction type, the intra prediction information is provided to the intra decoder (772). The residual information can be subject to inverse quantization and is provided to the residue decoder (773).

The inter decoder (780) is configured to receive the inter prediction information, and generate inter prediction results based on the inter prediction information.

The intra decoder (772) is configured to receive the intra prediction information, and generate prediction results based on the intra prediction information.

The residue decoder (773) is configured to perform inverse quantization to extract de-quantized transform coefficients, and process the de-quantized transform coefficients to convert the residual from the frequency domain to the spatial domain. The residue decoder (773) may also require certain control information (to include the Quantizer Parameter (QP)), and that information may be provided by the entropy decoder (771) (data path not depicted as this may be low volume control information only).

The reconstruction module (774) is configured to combine, in the spatial domain, the residual as output by the residue decoder (773) and the prediction results (as output by the inter or intra prediction modules as the case may be) to form a reconstructed block, that may be part of the reconstructed picture, which in turn may be part of the reconstructed video. It is noted that other suitable operations, such as a deblocking operation and the like, can be performed to improve the visual quality.

It is noted that the video encoders (303), (503), and (603), and the video decoders (310), (410), and (710) can be implemented using any suitable technique. In an embodiment, the video encoders (303), (503), and (603), and the video decoders (310), (410), and (710) can be implemented using one or more integrated circuits. In another embodiment, the video encoders (303), (503), and (503), and the video decoders (310), (410), and (710) can be implemented using one or more processors that execute software instructions.

Aspects of the disclosure provide techniques that can be used in the fields of inter prediction refinement, deblocking process and sub-block transform.

In various embodiments, for an inter-predicted CU, motion parameters including motion vectors, reference picture indices, reference picture list usage index, and/or other additional information can be used for inter-predicted sample generation. Inter prediction can include uni-prediction, bi-prediction, and/or the like. In uni-prediction, a reference picture list (e.g., a first reference picture list or a list 0 (L0) or a second reference picture list or a list 1 (L1)) can be used. In bi-prediction, both L0 and L1 can be used. The reference picture list usage index can indicate that the reference picture list(s) includes L0, L1, or L0 and L1.

The motion parameters can be signaled in an explicit or implicit manner. When a CU is coded with a skip mode, the CU can be associated with one PU and can include no significant residual coefficients (e.g., the residual coefficients are zero), no coded motion vector difference (MVD), or no reference picture index.

A merge mode can be used in which motion parameters for a current CU can be obtained from neighboring CUs, including spatial and temporal merge candidates, and optionally other merge candidates. The merge mode can be applied to an inter-predicted CU, and may be used for a skip mode. Alternatively, motion parameters can be explicit transmitted or signaled. For example, motion vectors, a corresponding reference picture index for each reference picture list, a reference picture list usage flag, and other information can be signaled explicitly per each CU.

In some embodiments, one or more of the following inter prediction coding tools are used: (1) extended merge prediction, (2) merge mode with motion vector difference (MMVD), (3) advanced motion vector prediction (AMVP) mode with symmetric MVD signaling, (4) affine motion compensated prediction, (5) sub block-based temporal motion vector prediction (SbTMVP), (6) adaptive motion vector resolution (AMVR), (7) motion field storage: 1/16th lama sample MV storage and 8×8 motion field compression, (8) bi-prediction with weighted averaging (BWA), (9) bi-directional optical flow (BDOF), (10) decoder side motion vector refinement (DMVR), (11) triangle partition prediction, and (12) combined inter and intra prediction (CIIP).

In some examples, extended merge prediction can be used. Specifically, in some examples (e.g., VTM4), the merge candidate list is constructed by including the five types of candidates in an order of: (1) spatial motion vector predictor (MVP) from spatial neighbor CUs; (2) temporal MVP from collocated CUs; (3) history-based MVP from a FIFO table; (4) pairwise average MVP; and (5) zero MVs. In some embodiments, the techniques used in merge candidate list construction include spatial candidate derivation, temporal candidate derivation, history-based merge candidate derivation and pair-wise average merge candidate derivation.

In an example, the size of merge list is signaled in slice header and the maximum allowed size of a merge list is 6 in some examples (e.g., VTM4). For each CU coded in merge mode, an index of the best merge candidate is encoded using truncated unary binarization (TU). The first binary of the merge index is coded with context coding, and bypass coding can be used for other binaries.

Figure 1:
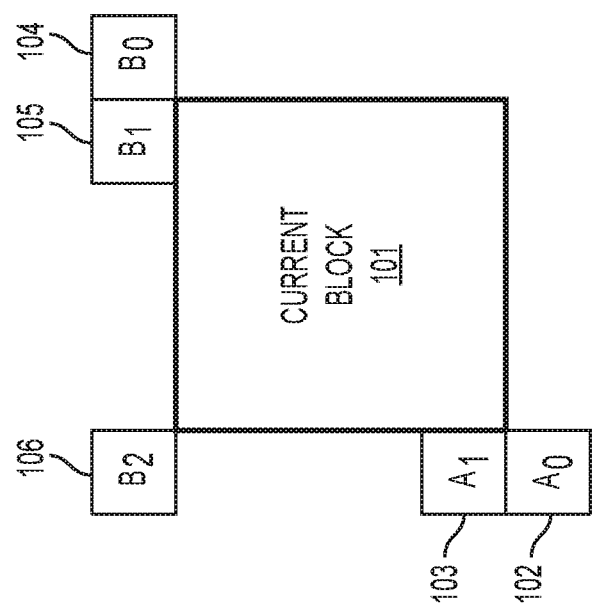
FIG. 1 is a schematic illustration of a current block and its surrounding spatial merge candidates in one example.

For spatial candidate derivation, according to an aspect of the disclosure, the derivation of spatial merge candidates in VVC is similar to that in HEVC. For example, a maximum of four merge candidates are selected among candidates located in the positions A0-A1 and B0-B2 depicted in FIG. 1. The order of derivation is A1, B1, B0, A0 and B2. Position B2 is considered only when any CU of position A1, B1, B0, A0 is not available (e.g. belonging to another slice or tile) or is intra coded. After candidate at position A1 is added, the addition of the remaining candidates is subject to a redundancy check which ensures that candidates with same motion information are excluded from the list so that coding efficiency is improved. To reduce computational complexity, not all possible candidate pairs are considered in the mentioned redundancy check.

Figure 8:
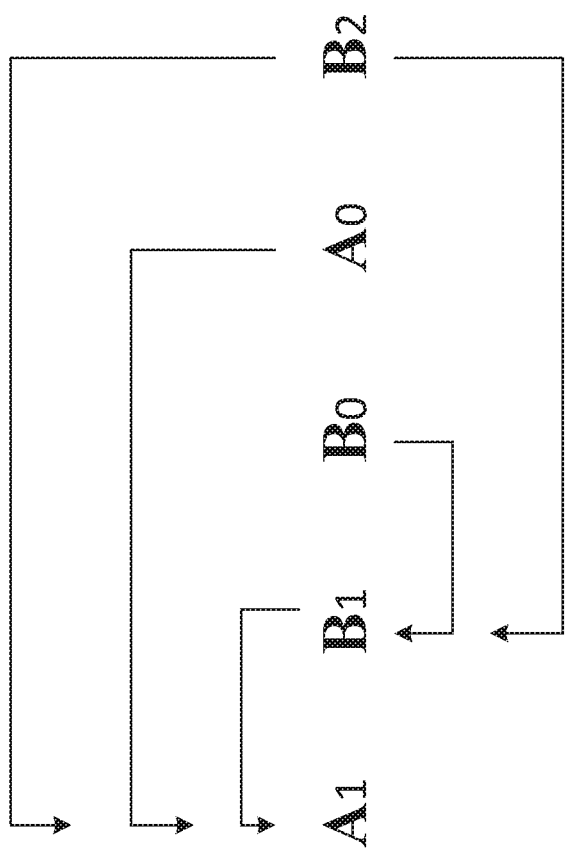
FIG. 8 shows a diagram illustrating redundancy check pairs for some embodiments.

FIG. 8 shows a diagram illustrating redundancy check pairs for some embodiments. In an embodiment, only pairs linked with an arrow in FIG. 8 are considered in redundancy check and a candidate is only added to the list if the corresponding candidate used for redundancy check has not the same motion information.

For temporal candidate derivation, according to an aspect of the disclosure, only one candidate is added to the list. Particularly, in the derivation of the temporal merge candidate, a scaled motion vector is derived based on a co-located CU belonging to the collocated reference picture. The reference picture list to be used for derivation of the co-located CU is explicitly signaled in the slice header.

Figure 9:
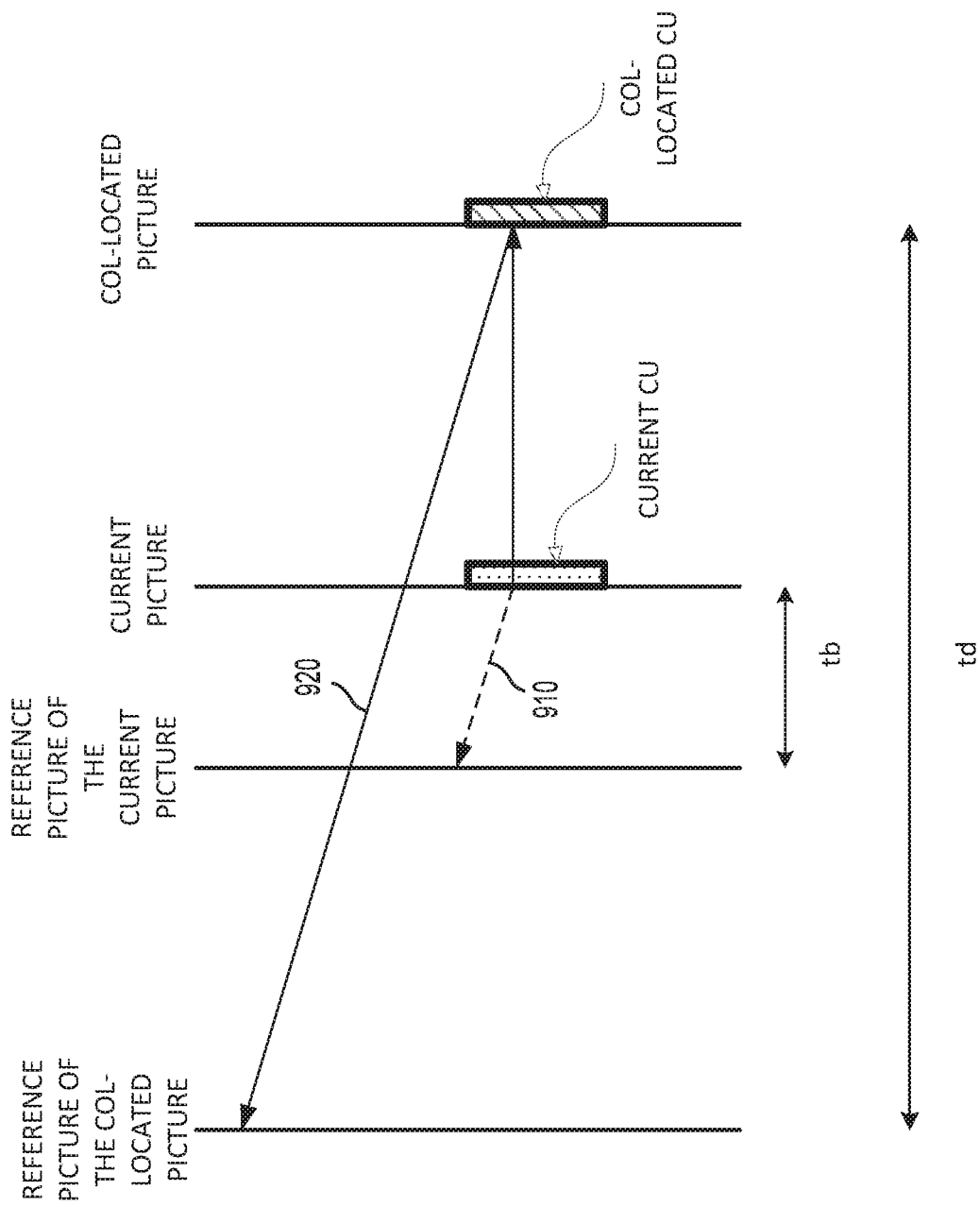
FIG. 9 shows an example for temporal candidate derivation.

FIG. 9 shows an example for temporal candidate derivation. Specifically, FIG. 9 shows a sequence of pictures that includes a current picture having a current CU, a collocated picture having a col-located CU of the current CU, a reference picture of the current picture and a reference picture of the col-located picture. In an example, a picture order count (POC) distance (e.g., difference of POCs) between the reference picture of the current picture and the current picture is denoted as tb, and the POC distance between the reference picture of the col-located picture and the col-located picture is denoted as td. The scaled motion vector for temporal merge candidate is shown by (910) in FIG. 9, which is scaled from the motion vector (920) of the co-located CU using the POC distances, tb and td (e.g., ratio of tb over td). The reference picture index of temporal merge candidate is set equal to zero in an example.

FIG. 10 shows an example for illustrating the position for the temporal candidate that is selected between candidates $C_0$ and $C_1$. When the CU at position $C_0$ is not available, or is intra coded, or is outside of the current row of CTUs, then the position $C_1$ can be used. Otherwise, the position $C_0$ is used in the derivation of the temporal merge candidate.

For affine motion compensated prediction, in HEVC, only translation motion model is applied for motion compensation prediction (MCP). The real world has many kinds of motion, e.g. zoom in/out, rotation, perspective motions and the other irregular motions. In some examples (e.g., VTM4), a block-based affine transform motion compensation prediction is applied.

Figure 11B:
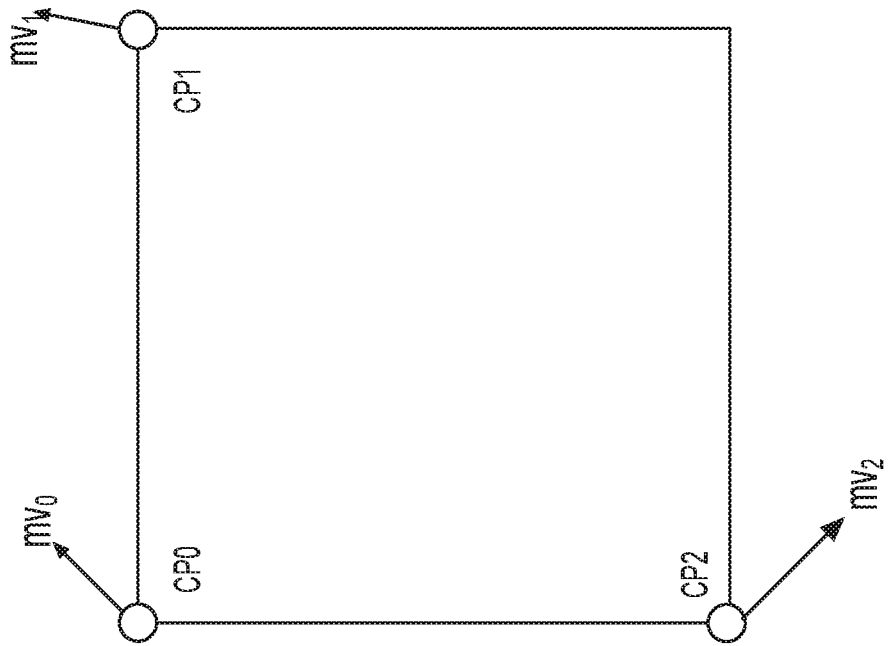
FIG. 11B shows the affine motion field of a block that is described by three control points (6-parameter affine model).
Figure 11A:
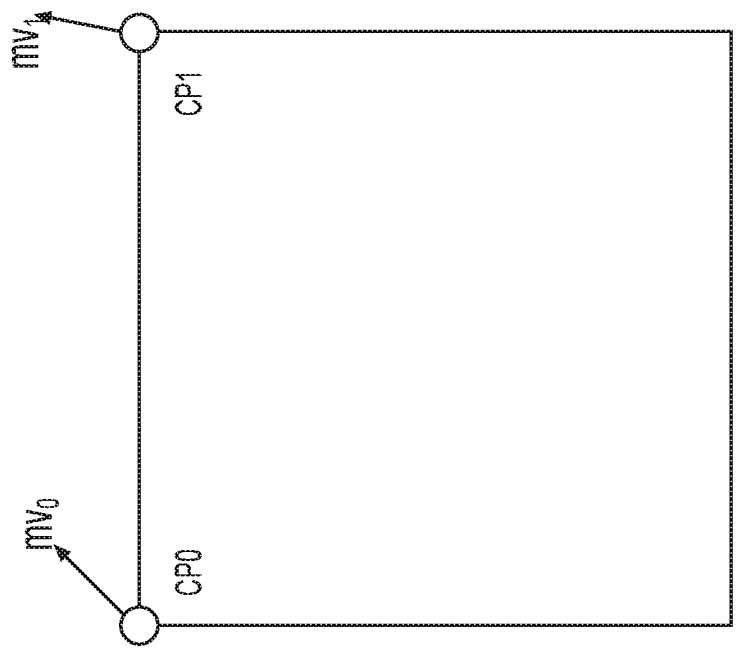
FIG. 11A shows the affine motion field of a block that is described by motion information of two control points (4-parameter affine model).

FIG. 11A shows the affine motion field of a block that is described by motion information of two control points (4-parameter affine model) and FIG. 11B shows the affine motion field of a block that is described by three control points (6-parameter affine model).

In some embodiments, the 4-parameter affine motion model, motion vector at sample location (x, y) in a block can be derived as (Eq. 1), and the 6-parameter affine motion model, motion vector at sample location (x, y) in a block can be derived as (Eq. 2):

$$\begin{cases} mv_x = \dfrac{mv_{1x} - mv_{0x}}{W}x + \dfrac{mv_{1y} - mv_{0y}}{W}y + mv_{0x} \\ mv_y = \dfrac{mv_{1y} - mv_{0y}}{W}x + \dfrac{mv_{1y} - mv_{0x}}{W}y + mv_{0y} \end{cases} \quad \text{(Eq. 1)}$$

$$\begin{cases} mv_x = \dfrac{mv_{1x} - mv_{0x}}{W}x + \dfrac{mv_{2x} - mv_{0x}}{H}y + mv_{0x} \\ mv_y = \dfrac{mv_{1y} - mv_{0y}}{W}x + \dfrac{mv_{2y} - mv_{0y}}{H}y + mv_{0y} \end{cases} \quad \text{(Eq. 2)}$$

where ($mv_{0x}$, $mv_{0y}$) denotes the motion vector of the top-left corner control point CP0, ($mv_{1x}$, $mx_{1y}$) is motion vector of the top-right corner control point CP1, and ($mv_{2x}$, $mv_{2y}$) is motion vector of the bottom-left corner control point CP2.

In order to simplify the motion compensation prediction, block based affine transform prediction is applied.

Figure 12:
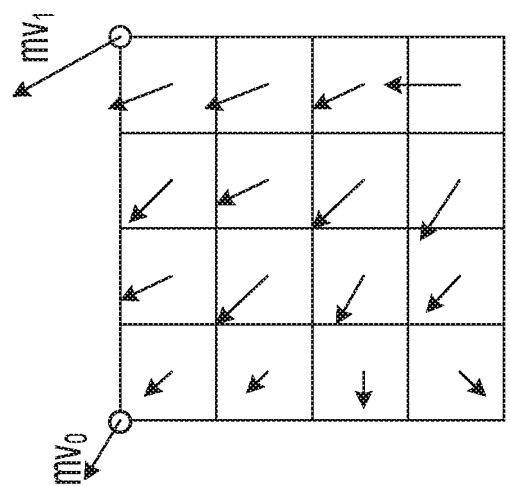
FIG. 12 shows an example of affine motion vector field per sub-block.

FIG. 12 shows an example of affine MV field per sub-block. The current CU is divided into 4×4 lama sub-blocks, To derive motion vector of each 4×4 lama sub-block, the motion vector of the center sample of each sub-block, as shown in FIG. 12, is calculated according to above equations, and rounded to 1/16 fraction accuracy for example. Then the motion compensation interpolation filters are applied to generate the prediction of each sub-block with derived motion vector. The sub-block size of chroma-components is also set to be 4×4. The MV of a 4×4 chroma sub-block is calculated as the average of the MVs of the four corresponding 4×4 lama sub-blocks in an example.

Two affine motion inter prediction modes, such as affine merge (AF_MERGE) mode and affine advanced MVP (affine AMVP) mode, can be used.

For affine merge prediction, in an example, AF_MERGE mode can be applied for CUs with both width and height larger than or equal to 8. In the AF_MERGE mode, the control point motion vectors (CPMVs) of the current CU are generated based on the motion information of the spatial neighboring CUs. In an example, there can be up to five control point motion vector predictor (CPMVP) candidates and an index is signalled to indicate the one to be used for the current CU. In an example, three types of CPMV candidates are used to form the affine merge candidate list. The first type of CPMV candidates is inherited affine merge candidates that extrapolated from the CPMVs of the neighbour CUs. The second type of CPMV candidates are constructed affine merge candidates CPMVPs that are derived using the translational MVs of the neighbour CUs. The third type of CPMV candidates is Zero MVs.

In some examples, such as in VTM3, a maximum of two inherited affine candidates can be used. In an example, two inherited affine candidates are derived from affine motion models of the neighboring blocks, one from left neighboring CUs (referred to as left predictor) and one from above neighboring CUs (referred to as above predictor). Using the neighboring blocks shown in FIG. 1 as an example, for the left predictor, the scan order is A0->A1, and for the above predictor, the scan order is B0->B1->B2. In an example, only the first inherited candidate from each side is selected. In some examples, no pruning check is performed between two inherited candidates. When a neighboring affine CU is identified, the control point motion vectors of the neighboring affine CU are used to derive the CPMVP candidate in the affine merge list of the current CU.

Figure 13:
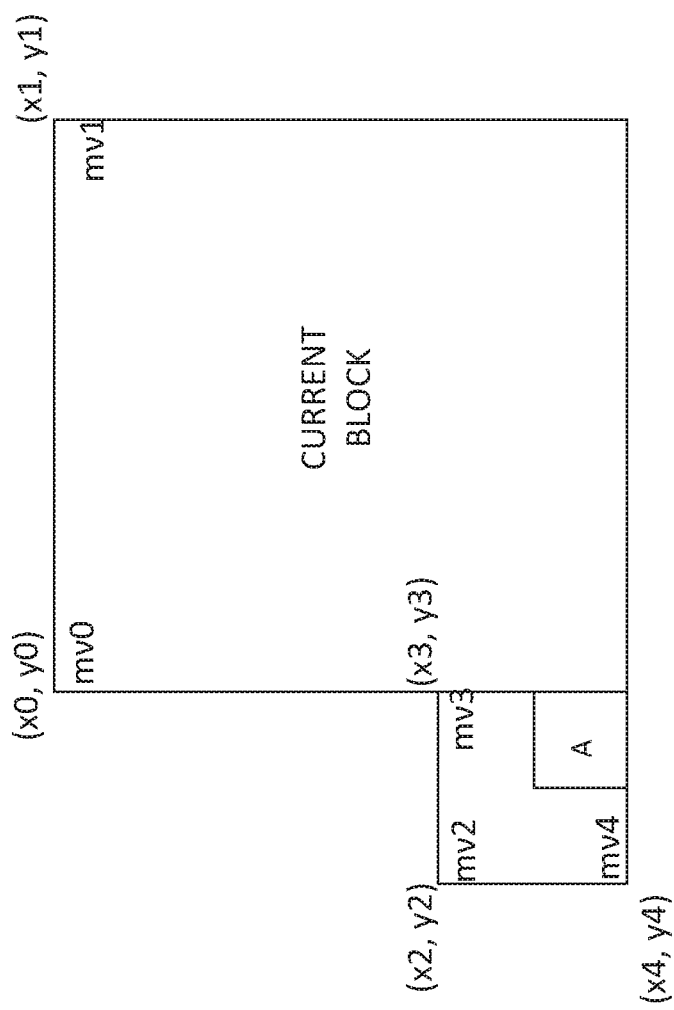
FIG. 13 shows an example for affine merge mode.

FIG. 13 shows an example for affine merge mode. As shown in FIG. 13, when the neighbour left bottom block A is coded in affine mode, the motion vectors $mv_2$, $mv_3$ and $mv_4$ of the top left corner, above right corner and left bottom corner of a CU which contains the block A are attained. When block A is coded with 4-parameter affine model, the two CPMVs of the current CU are calculated according to $mv_2$, and $mv_3$. In case that block A is coded with 6-parameter affine model, the three CPMVs of the current CU are calculated according to $mv_2$, $mv_3$ and $mv_4$.

In some examples, a constructed affine candidate is constructed by combining the neighbor translational motion information of each control point. The motion information for the control points can be derived from the specified spatial neighbors and temporal neighbor.

Figure 14:
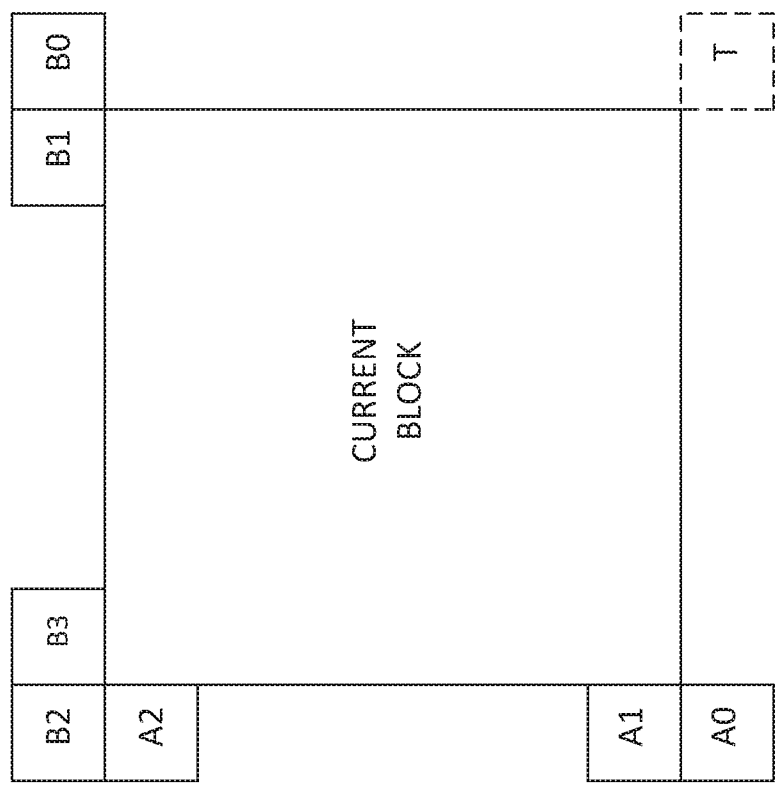
FIG. 14 shows an example of spatial neighbors and temporal neighbor according to some embodiments of the disclosure.

FIG. 14 shows an example of spatial neighbors (e.g., A0-A2 and B0-B3) and temporal neighbor (e.g., T) according to some embodiments of the disclosure. In an example, $CPMV_k$ (k=1, 2, 3, 4) represents the k-th control point. For $CPMV_1$, the B2->B3->A2 blocks are checked (-> is used for checking order) and the MV of the first available block is used. For $CPMV_2$, the B1->B0 blocks are checked and for $CPMV_3$, the A1->A0 blocks are checked. For TMVP, T is checked and is used as $CPMV_4$ if the MV of the block T is available.

After MVs of four control points are attained, affine merge candidates are constructed based on that motion information. The following combinations of control point MVs are used to construct in order: {$CPMV_1$, $CPMV_2$, $CPMV_3$}, {$CPMV_1$, $CPMV_2$, $CPMV_4$}, {$CPMV_1$, $CPMV_3$, $CPMV_4$}, {$CPMV_2$, $CPMV_3$, $CPMV_4$}, {$CPMV_1$, $CPMV_2$}, {$CPMV_1$, $CPMV_3$}.

The combination of 3 CPMVs can construct a 6-parameter affine merge candidate and the combination of 2 CPMVs can construct a 4-parameter affine merge candidate. In an example, to avoid motion scaling process, when the reference indices of control points are different, the related combination of control point MVs can be discarded.

In an example, after inherited affine merge candidates and constructed affine merge candidate are checked, if a candidate list is still not full, zero MVs are inserted to the end of the list.

For affine AMVP prediction, the affine AMVP mode can be applied on CUs with both width and height larger than or equal to 16. In some examples, an affine flag at CU level is signalled in the bitstream (e.g., coded video bitstream) to indicate whether affine AMVP mode is used in the CU and then another flag is signaled to indicate whether 4-parameter affine or 6-parameter affine is used. In the affine AMVP mode, the difference of the CPMVs of current CU and their predictors CPMVPs can be signalled in the bitstream. The affine AMVP candidate list size is 2 and the affine AMVP candidate list is generated by using the following four types of CPVM candidate in the order: (1) inherited affine AMVP candidates that extrapolated from the CPMVs of the neighbour CUs; (2) constructed affine AMVP candidates CPMVPs that are derived using the translational MVs of the neighbour CUs; (3) translational MVs from neighboring CUs; and (4) Zero MVs.

In some examples, the checking order of inherited affine AMVP candidates is the same as the checking order of inherited affine merge candidates. In an example, the only difference between the affine merge prediction and affine AMVP prediction is that, for AVMP candidate, only the affine CU that has the same reference picture as the current block is considered. In an example, no pruning process is applied when inserting an inherited affine motion predictor into the candidate list.

In some examples, constructed AMVP candidate can be derived from the specified spatial neighbors shown in FIG. 14. In an example, the same checking order is used as done in the candidate construction for the affine merge prediction. In addition, reference picture index of the neighboring block is also checked. The first block in the checking order that is inter coded and has the same reference picture as in current CUs is used. When the current CU is coded with 4-parameter affine mode, and motion vectors of two control points $mv_0$ and $mv_1$ are both available, the motion vectors of the two control points are added as one candidate in the affine AMVP list. When the current CU is coded with 6-parameter affine mode, and all three motion vectors of the control points CPMVs are available, they are added as one candidate in the affine AMVP list. Otherwise, constructed. AMVP candidate is set as unavailable.

When the number of affine AMVP list candidates is still less than 2 after inherited affine AMVP candidates and constructed AMPV candidate are checked, $mv_0$, $mv_1$ and $mv_2$ will be added, in order, as the translational MVs to predict all control point MVs of the current CU, when available. Finally, zero MVs are used to fill the affine AMVP list if the affine AMVP list is still not full.

In some examples, the sub block based temporal motion vector prediction (SbTMVP) can be used in VTM. Similar to the temporal motion vector prediction (TMVP) in HEVC, SbTMVP uses the motion field in the collocated picture to improve motion vector prediction and merge mode for CUs in the current picture. In some examples, the same collocated picture used by TMVP is used for SbTVMP. SbTMVP differs from TMVP in two aspects. In the first aspect, TMVP predicts motion at CU level but SbTMVP predicts motion at sub-CU level. In the second aspect, TMVP fetches the temporal motion vectors from the collocated block in the collocated picture (the collocated block is the bottom-right or center block relative to the current CU), SbTMVP applies a motion shift before fetching the temporal motion information from the collocated picture. The motion shift is obtained from the motion vector from one of the spatial neighboring blocks of the current CU.

Figure 15:
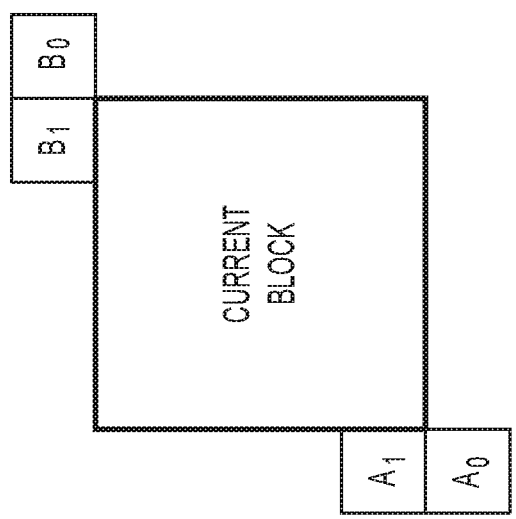
FIGS. 15-16 show an example of a sub block based temporal motion vector prediction process according to some embodiments of the disclosure.
Figure 16:
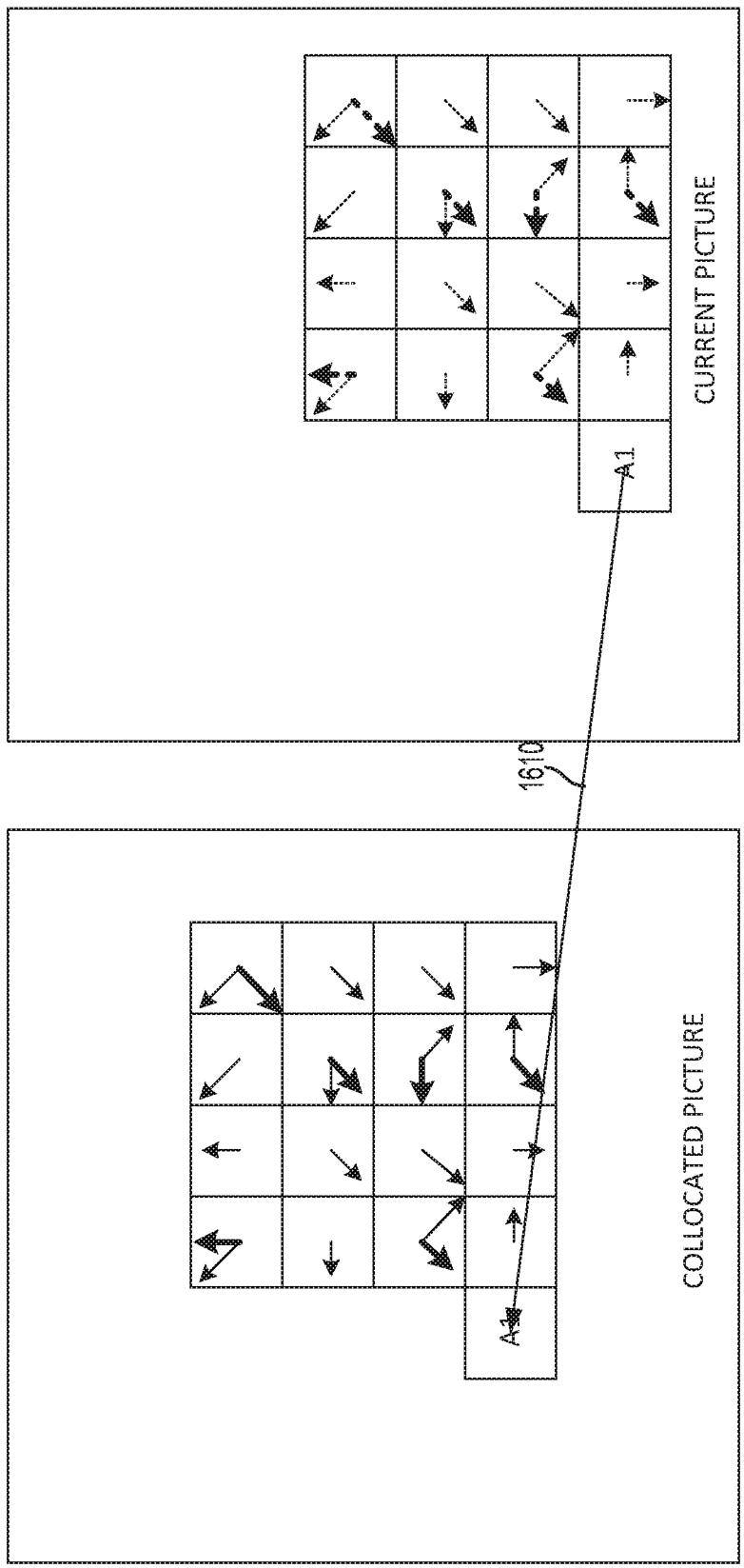

FIGS. 15-16 show an example of a SbTVMP process according to some embodiments of the disclosure. SbTMVP predicts the motion vectors of the sub-CUs within the current CU in two steps. In the first step, the spatial neighbors shown in FIG. 15 are examined in the order of A1, B1, B0 and A0 to identify a first spatial neighboring block that has a motion vector using the collocated picture as its reference picture. Then, the motion vector using the collected picture as its reference picture is selected to be the motion shift to be applied. If no such motion is identified from the spatial neighbors of A1, B1, B0 and A0, then the motion shift is set to (0, 0).

In the second step, the motion shift identified in the first step is applied (i.e. added to the current block's coordinates) to obtain sub-CU-level motion information (motion vectors and reference indices) from the collocated picture as shown in FIG. 16. In the FIG. 16 example, A1's motion vector is set as the motion shift (1610). Then, for each sub-CU, the motion information of the corresponding block (the smallest motion grid that covers the center sample) in the collocated picture is used to derive the motion information for the sub-CU. After the motion information of the collocated sub-CU is identified, it is converted to the motion vectors and reference indices of the current sub-CU in a similar way as the TMVP process of HEVC. For example, temporal motion scaling is applied to align the reference pictures of the temporal motion vectors to those of the current CU.

In some examples, such as in VTM3, a combined sub-block based merge list which includes both SbTVMP candidate and affine merge candidates is used for the signalling of sub-block based merge mode. The SbTVMP mode is enabled/disabled by a sequence parameter set (SPS) flag. When the SbTMVP mode is enabled, the SbTMVP predictor is added as the first entry of the combined sub-block based merge list, and followed by the affine merge candidates. The maximum allowed size of the sub-block based merge list is 5 in VTM3.

In an example, the sub-CU size used in SbTMVP is fixed to be 8×8, and as done for affine merge mode, SbTMVP mode is only applicable to the CU with both width and height are larger than or equal to 8.

In some embodiments, the encoding logic of the additional SbTMVP merge candidate is the same as for the other merge candidates. In an example, for each CU in P or B slice, an additional rate distortion check is performed to decide whether to use the SbTMVP candidate.

In some embodiments, a prediction refinement with optical flow (PROF) (also referred to as a PROF method) may be implemented to improve the sub block based affine motion compensation to have a finer granularity of motion compensation. In an embodiment, after the sub block based affine motion compensation is performed, differences (or refinement values, refinements, prediction refinements) derived based on an optical flow equation can be added to predicted samples (e.g., luma predicted samples, or luma prediction samples) to obtain refined predicted samples.

Figure 17:
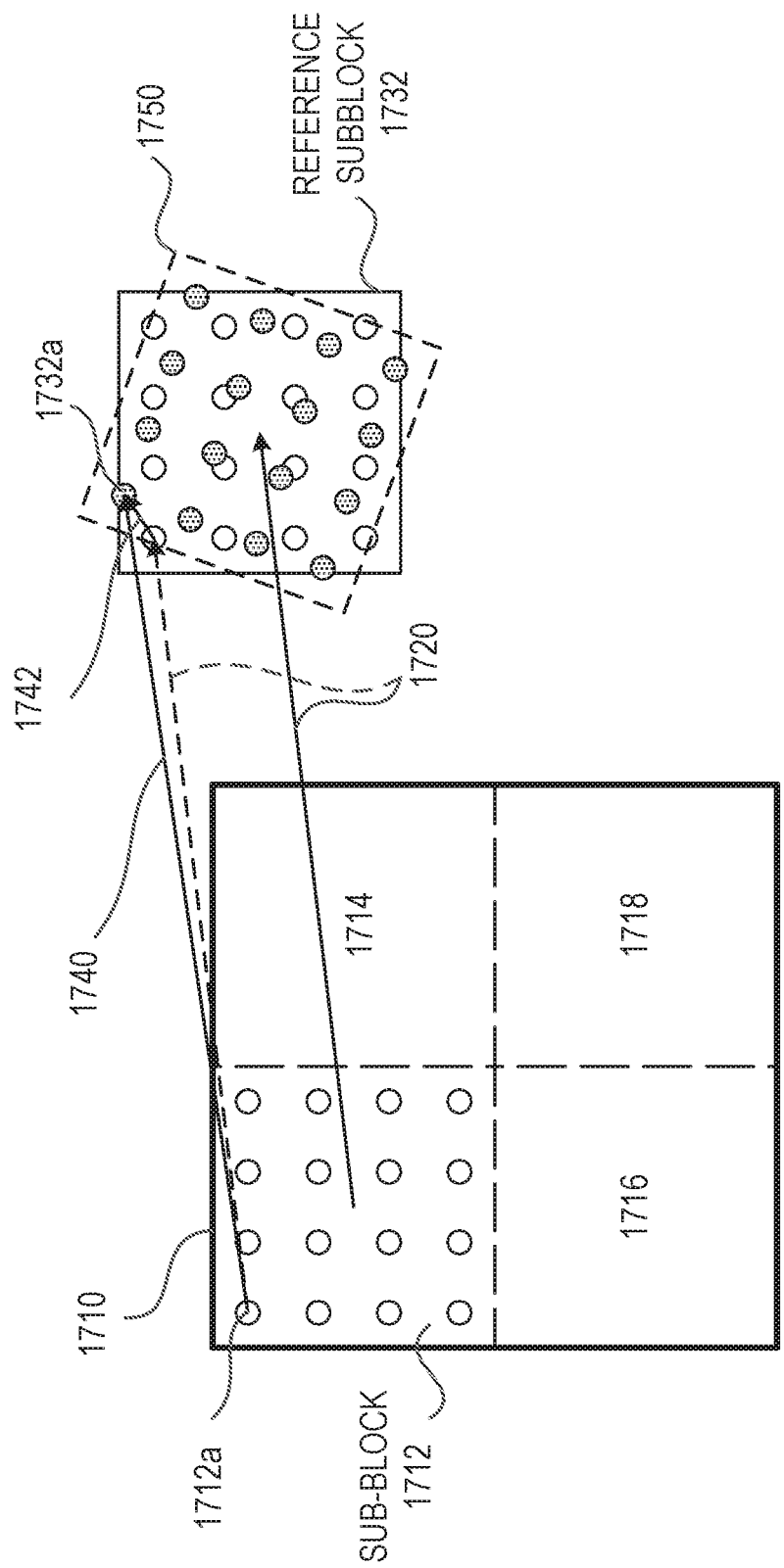
FIG. 17 shows a schematic illustration of an example of prediction refinement with optical flow in accordance with an embodiment of the disclosure.

FIG. 17 shows a schematic illustration of an example of the PROF method in accordance with an embodiment of the disclosure. A current block (1710) can be divided into four sub blocks (1712, 1714, 1716, and 1718). Each of the sub blocks (1712, 1714, 1716, and 1718) can have a size of 4×4 pixels or samples. A sub block MV (1720) for the sub block (1712) can be derived according to CPMVs of the current block 1710, for example, using a center location of the sub block (1712) and an affine motion model (e.g., the 4-parameter affine motion model, the 6-parameter affine motion model). The sub block MV (1720) can point to a reference sub block (1732) in a reference picture. Initial sub block predicted samples can be determined according to the reference sub block (1732).

In some examples, a translational motion from the reference sub block (1732) to the sub block (1712) as described by the sub block MV (1720) may not predict the sub block (1712) with a high accuracy. In addition to the translational motion described by the sub block MV (1720), the sub block (1712) can also experience a non-translational motion (e.g., a rotation as seen in FIG. 17). Referring to FIG. 17, a sub block (1750) in the reference picture having shaded samples (e.g., a sample (1732*a*)) corresponds to and can be used to reconstruct the samples in the sub block (1712). The shaded sample (1732*a*) can be shifted by the pixel MV (1740) to reconstruct a sample (1712*a*) in the sub block (1712) with a high accuracy. Thus, in some examples, when non-translational motion occurs, to improve an accuracy of the prediction, a suitable prediction refinement method can be applied in an affine motion model, as described bellow.

In an example, the PROF method is implemented using the following four steps. In Step (1), the sub block based affine motion compensation can be performed to generate a prediction, such as an initial sub block prediction I(i, j), for a current sub block (e.g., the sub block (1712)) where i and j are coordinates corresponding to a sample at position (i, j) (also referred to as a sample position, a sample location) in the current sub block (1712).

In Step (2), gradient calculations can be performed where spatial gradients $g_x(i, j)$ and $g_y(i, j)$ of the initial sub block prediction I(i, j) at each sample position (i, j) can be calculated using, for example, a 3-tap filter [−1, 0, 1] according to Eq. 3 and Eq. 4 as below:

$$g_x(i,j)=I(i+1,j)-I(i-1,j) \quad \text{(Eq. 3)}$$

$$g_y(i,j)=I(i,j+1)-I(i,j-1) \quad \text{(Eq. 4)}$$

The sub block prediction can be extended by one pixel on each side for the gradient calculations. In some embodiments, to reduce the memory bandwidth and complexity, the pixels on the extended borders can be copied from the nearest integer pixel position in the reference picture (e.g., the reference picture including the sub block (1732)). Therefore, additional interpolation for a padding region can be avoided.

In Step (3), a prediction refinement ΔI(i, j) can be calculated by Eq. 5 (e.g., an optical flow equation) as below.

$$\Delta I(i,j)=g_x(i,j)\times\Delta mv_x(i,j)+g_y(i,j)\times\Delta mv_y(i,j) \quad \text{(Eq. 5)}$$

where Δmv(i, j) (e.g., ΔMV (1742)) is a difference MV between a pixel MV or a sample MV mv (i, j) (e.g. pixel MV (1740)) for a sample location (i, j) and the sub block MV $Mv_{SB}$ (e.g., the sub block MV (1720)) of the sub block (e.g., the sub block (1712)) where the sample location (i, j) is located. Δmv(i, j) can also be referred to as a MV refinement (MVR) for the sample that is at the sample location (i, j) or the sample (i, j). Δmv(i, j) can be determined using Eq. 6 as below.

$$\Delta mv(i,j)=mv(i,j)-mv_{SB} \quad \text{(Eq. 6)}$$

$\Delta mv_x(i, j)$ and $\Delta mv_y(i, j)$ are an x component (e.g., a horizontal component) and a y component (e.g., a vertical component) of the difference MV Δmv(i, j), respectively.

Since the affine model parameters and the pixel locations relative to the sub block center position are not changed from one sub block to another sub block, Δmv(i, j) can be calculated for a first sub block (e.g., the sub block (1712)), and reused for other sub blocks (e.g., the sub blocks (1714), (1716), and (1718)) in the same current block (1710). In some examples, x and y represent a horizontal shift and a vertical shift of a sample position (i, j) with respect to the center position of the sub block (1712), Δmv(i, j) (e.g., including $\Delta mv_x(i, j)$ and $\Delta mv_y(i, j)$) can be derived by Eq. 7 as below, $$\begin{cases} \Delta mv_x(x, y) = a \times x + b \times y \\ \Delta my_y(x, y) = c \times x + d \times y \end{cases} \quad \text{(Eq. 7)}$$

where $\Delta mv_x$(x, y) is the x component $\Delta mv_x$(i, j) and $\Delta mv_y$(x, y) is the y component $\Delta mv_y$(i, j).

In an example, for a 4-parameter affine motion model, the parameters a-d are described by (Eq. 1). For a 6-parameter affine motion model, the parameters a-d are described by (Eq. 2) as described above.

In Step (4), the prediction refinement ΔI(i, j) (e.g., the luma prediction refinement) can be added to the initial sub block prediction I(i, j) to generate another prediction, such as a refined prediction I'(i, j). The refined prediction I'(i, j) can be generated using Eq. 8 as below for the sample (i, j):

$$I'(i,j)=I(i,j)+\Delta I(i,j). \quad \text{(Eq. 8)}$$

According to some aspects of the disclosure, a motion refinement technique that is referred to as bi-directional optical flow (BDOF) mode is used in inter prediction. BDOF is also referred to as BIO in some examples. BDOF can be used to refine a bi-prediction signal of a CU at a 4×4 sub block level. BDOF can be applied to a CU when the CU satisfies certain conditions. In an example, the conditions include: (i) the CU's height is not 4, and the CU size is not 4×8, (ii) the CU is not coded using affine mode or the ATMVP merge mode, (iii) the CU is coded using a "true" bi-prediction mode, e.g., one of the two reference pictures is prior to the current picture in a display order and the other is after the current picture in the display order. BDOF is only applied to a luma component in some examples. In an example, the conditions include: (i) the CU is coded using the "true" bi-prediction mode, e.g., one of the two reference pictures is prior to the current picture in a display order and the other is after the current picture in the display order, (ii) the distances (i.e., POC differences) from the two reference pictures to the current picture are identical, (iii) the two reference pictures are short-term reference pictures, (iv) the CU is not coded using affine mode or the ATMVP merge mode, (v) the CU has more than 64 luma samples, (vi) a CU height and a CU width are larger than or equal to 8 luma samples, (vii) a BCW weight index indicates an equal weight, (viii) a weighted prediction (WP) is not enabled for the current CU, and (ix) a CIIP mode is not used for the current CU.

Figure 18:
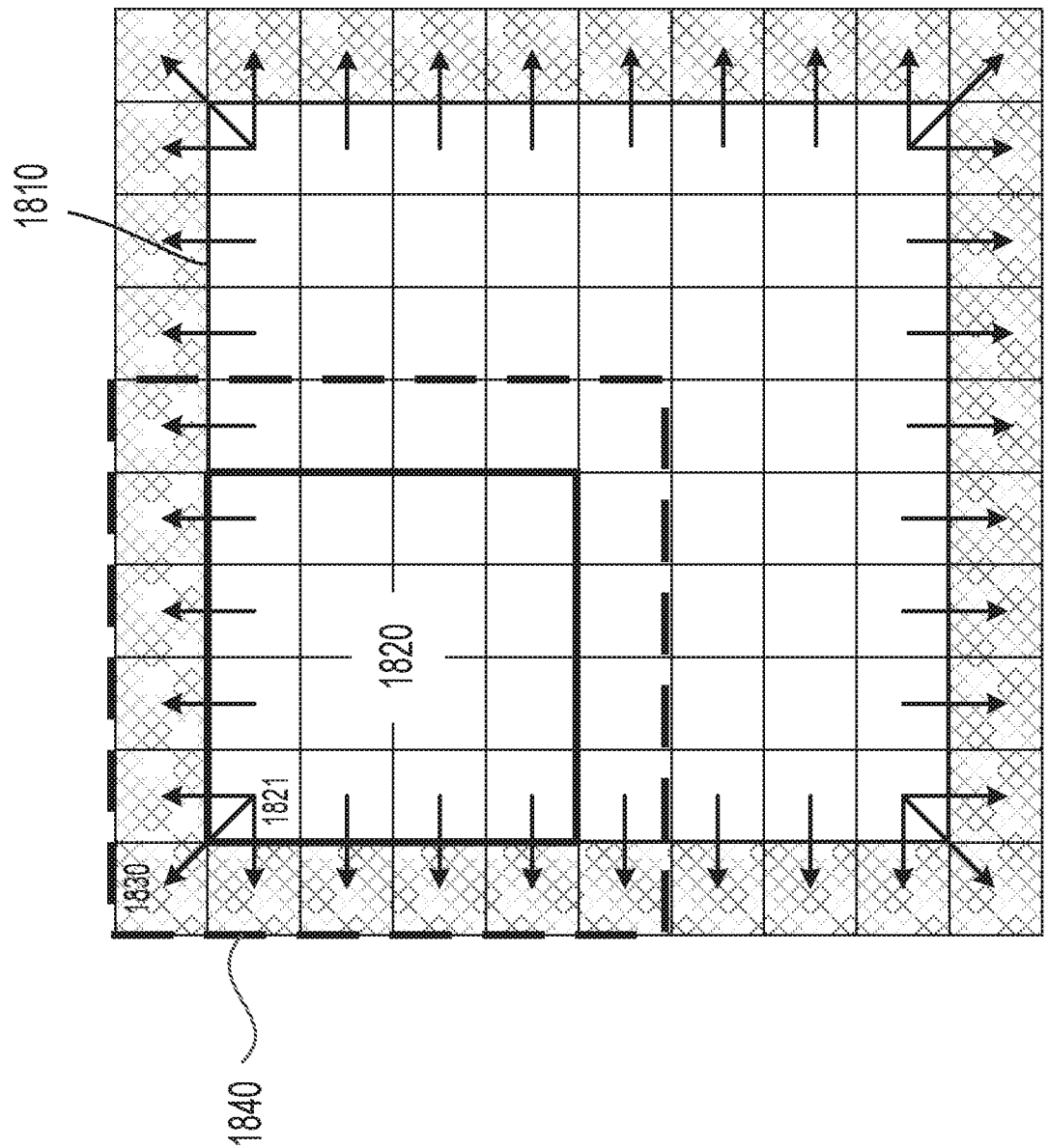
FIG. 18 shows a diagram for illustrating bi-directional optical flow in some examples.

FIG. 18 shows a diagram for illustrating BDOF in some examples. In an embodiment, the BDOF mode is applied to a luma component. The motion refinement in the BDOF mode is based on the optical flow concept, which assumes that the motion of an object is smooth. For each 4×4 sub block (e.g., a sub block (1820) in a CU (1810) in FIG. 18), a motion refinement ($\Delta mv_x$, $\Delta mv_y$) is calculated by minimizing a difference between the L0 and L1 prediction samples. The motion refinement is then used to adjust the bi-predicted sample values in the 4×4 sub-block (e.g., the sub block (1820)). The following steps are applied in the BDOF process.

First, the horizontal and vertical gradients, $$\frac{\partial I^{(k)}}{\partial x}(i, j) \text{ and } \frac{\partial I^{(k)}}{\partial y}(i, j),$$

k=0, 1, of the two prediction signals are computed by directly calculating the difference between two neighboring samples, e.g., $$\frac{\partial I^{(k)}}{\partial x}(i, j) = (I^{(k)}(i+1, j) - I^{(k)}(i-1, j)) \gg \text{shift1} \quad \text{(Eq. 9)}$$

$$\frac{\partial I^{(k)}}{\partial y}(i, j) = (I^{(k)}(i, j+1) - I^{(k)}(i, j-1)) \gg \text{shift1}$$

where $I^{(k)}(i, j)$ is the sample value at coordinate (i, j) of the prediction signal in list k, k=0, 1, and the parameter shift1 is calculated based on a luma bit depth, bitDepth. In an example, shift1=max(6, bitDepth−6). In some examples, shift 1 is equal to a maximum of 2 and (14-bitDepth). In an example, calculations in Eq. 9 can be adapted to calculations in Eqs. 10-11.

$$\frac{\partial I^{(k)}}{\partial x}(i, j) = ((I^{(k)}(i+1, j) \gg \text{shift1}) - (I^{(k)}(i-1, j) \gg \text{shift1})) \quad \text{(Eq. 10)}$$

$$\frac{\partial I^{(k)}}{\partial y}(i, j) = ((I^{(k)}(i, j+1) \gg \text{shift1}) - (I^{(k)}(i, j-1) \gg \text{shift1})) \quad \text{(Eq. 11)}$$

In an example, auto-correlations and cross-correlations of gradients, $S_1$, $S_2$, $S_3$, $S_5$ and $S_6$, are calculated as below.

$$S_1 = \sum_{(i,j)\in\Omega} \psi_x(i, j) \cdot \psi_x(i, j), \quad \text{(Eq. 12)}$$

$$S_3 = \sum_{(i,j)\in\Omega} \theta(i, j) \cdot \psi_x(i, j)$$

$$S_2 = \sum_{(i,j)\in\Omega} \psi_x(i, j) \cdot \psi_y(i, j)$$

$$S_5 = \sum_{(i,j)\in\Omega} \psi_y(i, j) \cdot \psi_y(i, j)$$

$$S_6 = \sum_{(i,j)\in\Omega} \theta(i, j) \cdot \psi_y(i, j)$$

where $$\psi_x(i, j) = \left(\frac{\partial I^{(1)}}{\partial x}(i, j) + \frac{\partial I^{(0)}}{\partial x}(i, j)\right) \gg n_a \quad \text{(Eq. 13)}$$

$$\psi_y(i, j) = \left(\frac{\partial I^{(1)}}{\partial y}(i, j) + \frac{\partial I^{(0)}}{\partial y}(i, j)\right) \gg n_a$$

$$\theta(i, j) = (I^{(1)}(i, j) \gg n_b) - (I^{(0)}(i, j) \gg n_b)$$

and $\Omega$ is a 6×6 window (e.g., (1840)) around the 4×4 sub block (e.g., the sub block (1820)), and the values $n_a$ and $n_b$ are set equal to min(5, bitDepth−7) and min(8, bitDepth−4), respectively.

In an example, the auto-correlations and cross-correlations of gradients, $S_1$, $S_2$, $S_3$, $S_5$ and $S_6$, are calculated as below using (Eq. 14):

$$S_1 = \sum_{(i,j)\in\Omega} \text{Abs}(\psi_x(i, j)) \quad \text{(Eq. 14)}$$

$$S_2 = \sum_{(i,j)\in\Omega} \psi_x(i, j) \cdot \text{Sign}(\psi_y(i, j))$$

$$S_3 = \sum_{(i,j)\in\Omega} \theta(i, j) \cdot \text{Sign}(\psi_x(i, j))$$

$$S_5 = \sum_{(i,j)\in\Omega} \text{Abs}(\psi_y(i, j))$$

$$S_6 = \sum_{(i,j)\in\Omega} \theta(i, j) \cdot \text{Sign}(\psi_y(i, j))$$

where $\Omega$ is a 6×6 window (e.g., (1840)) around the 4×4 sub block (e.g., the sub block (1820)), and the values $n_a$ and $n_b$ are set equal to min(1, bitDepth−11) and min(4, bitDepth−8), respectively.

The motion refinement or MVR ($\Delta mv_x$, $\Delta mv_y$) can be derived using the auto-correlations and cross-correlations using the following.

$$\Delta mv_x = \quad \text{(Eq. 15)}$$
$$S_1 > 0 ? \text{clip3}(-th'_{BIO}, -th'_{BIO}, -((S_3 \cdot 2^{n_b-n_a}) \gg \lfloor \log_2 S_1 \rfloor)) : 0$$

$$\Delta mv_y = S_5 > 0 ? \text{clip3}(-th'_{BIO}, th'_{BIO}, \quad \text{(Eq. 16)}$$
$$-((S_6 \cdot 2^{n_b-n_a} - ((v_x S_{2,m}) \ll n_{S_2} + v_x S_{2,s})/2) \gg$$
$$\lfloor \log_2 S_5 \rfloor)) : 0$$

where $$S_{2,m} = S_2 \gg n_{S_2}, S_{2,s} = S_2 \& (2^{n_{S_2}} - 1),$$

$\lfloor \cdot \rfloor$ is the floor function, and $n_{S_2}=12$. In an example, $th'_{BIO}=2^{max(5, BD-7)}$. In an example, $th'_{BIO}=2^{13-BD}$.

Based on the motion refinement and the gradients, the following adjustment (or prediction refinement) b(x, y) can be calculated for each sample in the 4×4 sub block:

$$b(x, y) = \text{rnd}\left(\frac{\left(\Delta mv_x\left(\frac{\partial I^{(1)}(x, y)}{\partial x} - \frac{\partial I^{(0)}(x, y)}{\partial x}\right) + \Delta mv_y\left(\frac{\partial I^{(1)}(x, y)}{\partial y} - \frac{\partial I^{(0)}(x, y)}{\partial y}\right) + 1\right)}{2}\right) \quad \text{(Eq. 17)}$$

In an example, the above calculations in Eq. (17) can be adapted to the following calculations in Eq. 18.

$$b(x, y) = \text{rnd}\left(\left(\Delta mv_x\left(\frac{\partial I^{(1)}(x, y)}{\partial x} - \frac{\partial I^{(0)}(x, y)}{\partial x}\right)\right)/2\right) + \text{rnd}\left(\left(\Delta mv_y\left(\frac{\partial I^{(1)}(x, y)}{\partial y} - \frac{\partial I^{(0)}(x, y)}{\partial y}\right)\right)/2\right) \quad \text{(Eq. 18)}$$

where the function 'rnd' represents a rounding operation.

The BDOF samples of the CU can be calculated by adjusting the bi-prediction samples as follows:

$$\text{pred}_{BDOF}(x,y) = (I^{(0)}(x,y) + I^{(1)}(x,y) + b(x,y) + o_{\text{offset}}) \gg \text{shift} \quad \text{(Eq. 19)}$$

In an embodiment, the values are selected such that multipliers in the BDOF process do not exceed 15-bit, and the maximum bit-width of the intermediate parameters in the BDOF process is kept within 32-bit.

In an example, to derive the gradient values, prediction samples $I^{(k)}(i, j)$ in the list k (k=0, 1) that are outside the current CU boundaries are to be generated. Referring to FIG. 18, the BDOF (e.g., in VVC) can use an extended row/column around boundaries of a CU (1810). In order to control a computational complexity of generating out-ofboundary prediction samples (e.g., a prediction for a sample (1830) or a prediction sample (1830)), prediction samples in the extended area (patterned areas in FIG. 18) can be generated by taking reference samples at nearby integer positions (e.g., using a floor operation on the coordinates) directly without interpolation. In an example, an 8-tap motion compensation interpolation filter (also referred to as an 8-tap interpolation filter) is used to generate prediction samples within the CU (1810) (white positions). In an example shown in FIG. 18, the CU (1810) includes 8×8 samples. In an example, the extended sample values are used in gradient calculations only. The gradient calculations can use (Eq. 9) or (Eq. 10-Eq. 11), as described above.

Referring to FIG. 18, for the remaining steps (e.g., Eqs. 12-14) in the BDOF process, if prediction sample(s) and gradient value(s) outside the CU boundaries are used, the prediction sample(s) and the gradient value(s) outside the CU boundaries can be padded (e.g., repeated) from corresponding nearest neighbors as indicated by arrows in FIG. 18. For example, the prediction sample and the gradient values at (1830) can be padded from the corresponding prediction sample and the gradient values at (1821).

In an embodiment, when the width and/or the height of a CU is larger than 16 luma samples, the CU can be split into sub blocks with a width and/or a height equal to 16 luma samples, and the sub block boundaries can be treated as the CU boundaries in the BDOF process. For example, a maximum unit size for the BDOF process is limited to 16×16 samples. In an example, for a sub block, the BDOF process can be skipped. In an example, when the SAD between the initial L0 and L1 prediction samples is smaller than a threshold, the BDOF process is not applied to the sub block. The threshold can be set equal to (8×W×(H»1)) where W indicates a sub block width and H indicates a sub block height. To avoid the additional complexity of SAD calculation, the SAD between the initial L0 and L1 prediction samples calculated in a DVMR process can be reused here.

In some examples of BDOF (e.g., VTM5), the calculation of the optical flow may require many multiplications. For example, BDOF can be calculated in a 3-step process. In the first step, the gradient images are calculated using the prediction images of two reference blocks. In the second step, five types of correlations are calculated per 4×4 sub block, and, the optical flow is derived. In the third step, the BDOFoffset is calculated per pixel and prediction samples are generated. In the 3-step process, the multiplication occurs when calculating correlations and BDOFoffset. Especially, the calculation of five types of correlations requires a large number of multiplications. The correlation calculations in (Eq. 14) may be written in equivalent forms as following (correlations per 4×4 sub block unit) (Eq. 20-Eq. 24):

$$t_1 = \Sigma_{[i,j] \in \Omega}(I_x^1 + I_x^0) \times (I_x^1 + I_x^0) \tag{Eq. 20}$$

$$t_2 = \Sigma_{[i,j] \in \Omega}(I_y^1 + I_y^0) \times (I_y^1 + I_y^0) \tag{Eq. 21}$$

$$t_3 = \Sigma_{[i,j] \in \Omega}(-(I_x^1 + I_x^0) \times (I^0 - I^1)) \tag{Eq. 22}$$

$$t_4 = \Sigma_{[i,j] \in \Omega}(-(I_y^1 + I_y^0) \times (I^0 - I^1)) \tag{Eq. 23}$$

$$t_5 = \Sigma_{[i,j] \in \Omega}(I_x^1 + I_x^0) \times (I_y^1 + I_y^0) \tag{Eq. 24}$$

where $I^0$, $I^1$ are the prediction images from motion compensation (MC) on reference L0 and L1; $I_x^0$, $I_x^1$, $I_y^0$, $I_y^1$ are the corresponding gradient images; $\Omega$ is the 6×6 area for each 4×4 sub block.

Then, motion refinement are calculated as (Eq. 25-Eq. 26):

$$v_x = \frac{t3}{t1} \tag{Eq. 25}$$

$$v_y = \frac{t4 - v_x \times t5}{t2} \tag{Eq. 26}$$

BDOF offset (per sample unit) can be calculated as (Eq. 27)

$$\text{BDOFoffset} = (v_x \times (I_x^0 - I_x^1))/2 + (v_y \times (I_y^0 - I_y^1))/2 \tag{Eq. 27}$$

In some examples, BDOF can be performed using a simplified calculation process. In an example, the multiplication of gradient values in calculating correlations in BDOF can be replaced with the sign function. The correlation per 4×4 sub block unit may be calculated as:

$$t_1 = \Sigma_{[i,j] \in \Omega} \text{abs}(I_x^1 + I_x^0) \tag{Eq. 28}$$

$$t_2 = \Sigma_{[i,j] \in \Omega} \text{abs}(I_y^1 + I_y^0) \tag{Eq. 29}$$

$$t_3 = \Sigma_{[i,j] \in \Omega}(-\text{sign}(I_x^1 + I_x^0) \times (I^0 - I^1)) \tag{Eq. 30}$$

$$t_4 = \Sigma_{[i,j] \in \Omega}(-\text{sign}(I_y^1 + I_y^0) \times (I^0 - I^1)) \tag{Eq. 31}$$

$$t_5 = \Sigma_{[i,j] \in \Omega} \text{sign}(I_y^1 + I_y^0) \times (I_x^1 + I_x^0) \tag{Eq. 32}$$

where $I^0$, $I^1$ are the prediction image from motion compensation (MC) on reference L0 and L1; $I_x^0$, $I_x^1$, $I_y^0$, $I_y^1$ are the corresponding gradient images; $\Omega$ is the 6×6 area for each 4×4 sub block.

$$\text{sign}(Z) = \begin{cases} 1 & (Z > 0) \\ 0 & (Z = 0) \\ -1 & (Z < 0) \end{cases} \tag{Eq. 33}$$

Then, motion refinement are calculated as (Eq. 34-Eq. 35):

$$v_x = \frac{t3}{s1} \tag{Eq. 34}$$

$$v_y = \frac{t4 - v_x \times t5}{t2} \tag{Eq. 35}$$

BDOF offset (per sample unit) can be calculated as:

$$\text{BDOFoffset} = (v_x \times (I_x^0 - I_x^1))/2 + (v_y \times (I_y^0 - I_y^1))/2 \tag{Eq. 36}$$

In some embodiments, a sub-block transform (SBT), also referred to as spatially varying transform (SVT), is employed in inter predicted CU. The SBT can be applied to inter prediction residuals. For example, in a coding block, only a portion of the coding block is treated as a residual block, and transform is applied to the portion of the coding block. Zero residual is assumed for the remaining portion of the coding block. Therefore, the residual block is smaller than the coding block, and a transform size in SBT is smaller than the coding block size. For the region which is not covered by the residual block, no transform processing is performed.

For example, when inter-predicted CU with cu_cbf equal to 1, cu_sbt_flag may be signaled to indicate whether the whole residual block or a sub-part of the residual block is coded. In the former case, inter multiple transforms selection (MTS) information is further parsed to determine the transform type of the CU. In the latter case, a part of the residual block is coded with inferred adaptive transform and the rest of the residual block is zeroed out.

When SBT is used for an inter-coded CU, SBT type and SBT position information are signaled in the bitstream. There are two SBT types and two SBT positions in some examples.

FIGS. 19A-19D show sub-block types (SBT-H, SBT-V) (e.g., vertically or horizontally partitioned), sizes and positions (e.g., left half, left quarter, right half, right quarter, top half, top quarter, bottom half, bottom quarter) supported in SBT. In a CU, the shaded region labeled by letter "A" is the portion of residual block with transform, and the other region is assumed to be zero residual without transform.

For SBT-V (or SBT-H), the TU width (or height) may equal to half of the CU width (or height) or ¼ of the CU width (or height), resulting in 2:2 split or 1:3/3:1 split. The 2:2 split is like a binary tree (BT) split while the 1:3/3:1 split is like an asymmetric binary tree (ABT) split. In ABT splitting, the small region contains the non-zero residual. If one dimension of a CU is 8 in luma samples, the 1:3/3:1 split along that dimension is disallowed. There are at most 8 SBT modes for a CU.

Figure 19A:
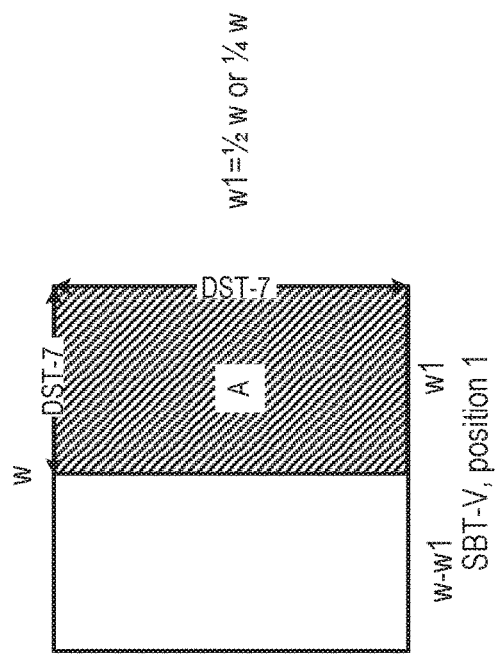
FIGS. 19A-19D show diagrams illustrating sub block types for sub block transforms.
Figure 19B:
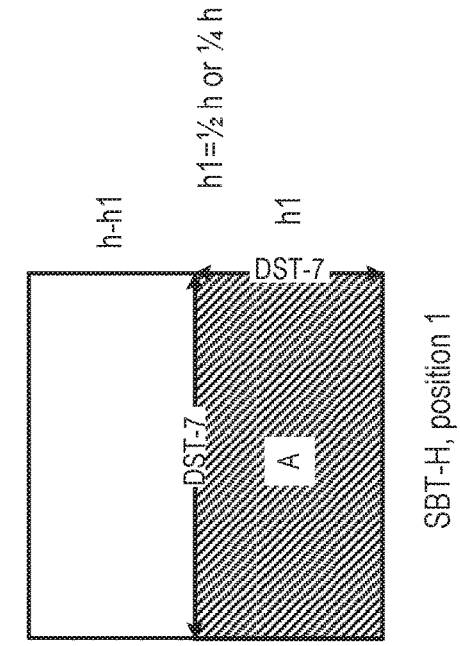
Figure 19C:
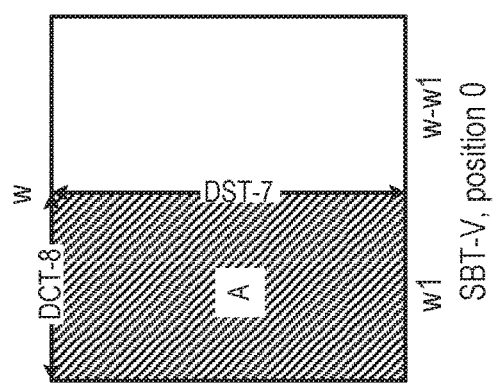
Figure 19D:
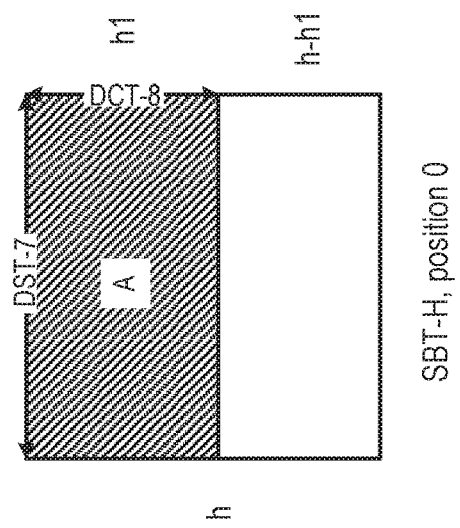

Position-dependent transform core selection is applied on luma transform blocks in SBT-V and SBT-H (chroma TB using DCT-2 in some examples). The two positions of SBT-H and SBT-V are associated with different core transforms. In an example, the horizontal and vertical transforms for each SBT position are shown in FIG. 19A-19C. For example, the horizontal and vertical transforms for SBT-V position 0 is DCT-8 and DST-7, respectively. When one side of the residual TU is greater than 32, the transform for both dimensions is set as DCT-2. Therefore, the sub-block transform can jointly specify the TU tiling, cbf, and horizontal and vertical core transform type of a residual block.

In some examples, a variable denoted by maxSbtSize is signaled in SPS to specify the max CU size for which SBT can be applied. In an example (e.g., VTM5), for high definition (HD) and 4K video sequences, maxSbtSize is set as 64 by encoder; and for other smaller resolution sequences, maxSbtSize can be set as 32.

In some examples, the SBT is not applied to the CU coded with combined inter-intra mode or triangular partition mode (TPM) mode.

In some embodiments, deblocking filter techniques can be used. In an example (e.g., HEVC), a deblocking filtering process is performed for each CU in the same order as the decoding process. For example, edges of a CU can be respectively filtered. In an example, vertical edges are first filtered (horizontal filtering) and then horizontal edges are filtered (vertical filtering). In some examples, filtering may be applied to the 8×8 block boundaries both for luma and chroma components; 4×4 block boundaries may not be processed in order to reduce the complexity. A boundary strength (Bs) can be used to indicate a degree or strength of a deblocking filtering process that may be used for a boundary. In an embodiment, a value of 2 for Bs indicates strong filtering, a value of 1 indicates weak filtering, and a value of 0 indicates no deblocking filtering.

In an embodiment, Bs is calculated on a 4×4 sample grid basis, but can be re-mapped to an 8×8 sample grid. In an example, an 8×8 block includes four 4×4 blocks, so a boundary of the 8×8 block includes two sides of two adjacent 4×4 blocks. The maximum of the two values of Bs which correspond to 8 pixels forming a line in the 4×4 grid can be selected as the Bs for boundaries in the 8×8 grid.

Figure 20:
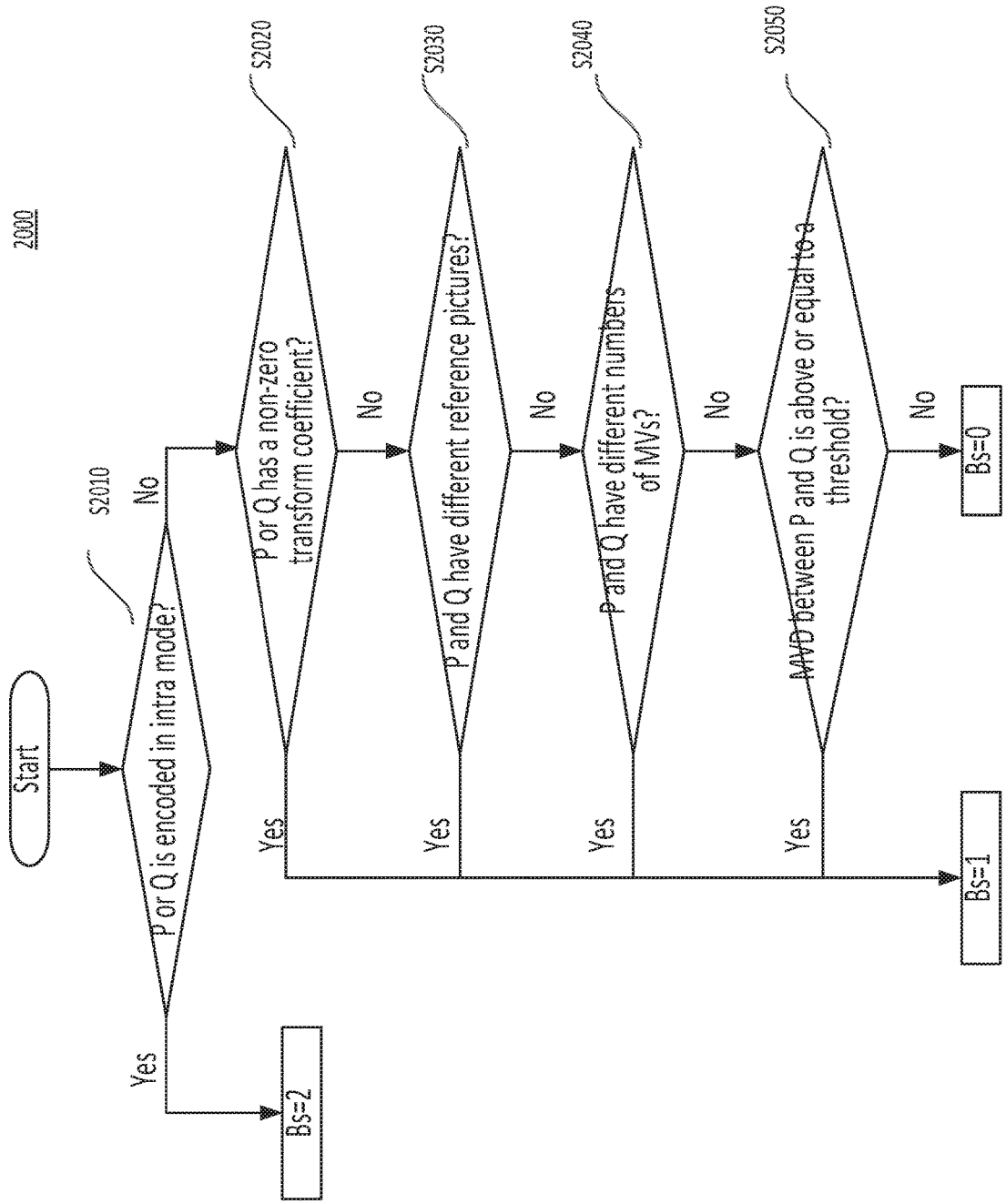
FIG. 20 shows a flow chart of an exemplary process for determining deblocking filter strength value according to an embodiment of the disclosure.

FIG. 20 shows a flow chart of an exemplary process (2000) for determining a Bs value according to an embodiment of the disclosure. It is noted that the order of the steps in FIG. 20 can be reordered or one or more steps omitted in other embodiments.

In FIG. 20, P and Q are two adjacent blocks with a boundary between them. In a vertical edge case, P can represent a block located to the left of the boundary and Q can represent a block located to the right of the boundary. In a horizontal edge case, P can represent a block located above the boundary and Q can represent a block located below the boundary.

As shown in FIG. 20, a Bs value can be determined based on a prediction mode (e.g., intra coding mode), a non-zero transform coefficient (e.g., existence of non-zero transform coefficients), a reference picture, a number of motion vectors, and a motion vector difference.

At step (S2010), the process (2000) determines whether P or Q is coded in an intra prediction mode. When at least one of P and Q is determined to be coded in the intra prediction mode, the process (2000) determines a first value (e.g., 2) for the Bs. Otherwise, the process (2000) proceeds to step (S2020).

At step (S2020), the process (2000) determines whether P or Q has a non-zero transform coefficient. When at least one of P and Q is determined to have a non-zero transform coefficient, the process (2000) determines a second value (e.g., 1) for the Bs. Otherwise, the process (2000) proceeds to step (S2030).

At step (S2030), the process (2000) determines whether P and Q have different reference pictures. When P and Q are determined to have different reference pictures, the process (2000) determines a third value (e.g., 1) for the Bs. Otherwise, the process (2000) proceeds to step (S2040).

At step (S2040), the process (2000) determines whether P and Q have different numbers of motion vectors. When P and Q are determined to have different numbers of motion vectors, the process (2000) determines a fourth value (e.g., 1) for the Bs. Otherwise, the process (2000) proceeds to step (S2050).

At step (S2050), the process (2000) determines whether a motion vector difference between P and Q is above or equal to a threshold T. When the motion vector difference between P and Q is determined to be above or equal to the threshold T, the process (2000) determines a fifth value (e.g., 1) for the Bs, Otherwise, the process (2000) determines a sixth value (e.g., 0) for the Bs. In an embodiment, the threshold T is set to 1 pixel. In an example, the MV precision is ¼ pixel and a value of the MV difference threshold can be set to 4. In another example, the MV precision is 1/16 and the value of the MV difference can be set to 16.

The above deblocking filtering process may be modified in some examples, such as the VTM5. In some embodiments, one or more of the following modifications can be made: (1) the filter strength of the deblocking filter can be dependent of the averaged luma level of the reconstructed samples; (2) deblocking tC table can be extended; (3) stronger deblocking filter may be used for luma; (4) stronger deblocking filter may be used for chroma; (5) different deblocking grids may be used for luma and chroma, for example, luma deblocking is performed on 4×4 sample grid, and chroma deblocking is performed on 8×8 sample grid.

Specifically, in an embodiment, the filter strength is dependent on reconstructed average luma level. In some examples (e.g., HEVC), the filter strength of the deblocking filter is controlled by the variables β and $t_C$ which are derived from the averaged quantization parameters $qP_L$. In the VTM5 in an example, the strength of the deblocking filter is also controlled by an offset to $qP_L$, the offset is set according to the luma level of the reconstructed samples. The reconstructed luma level LL can be derived as (Eq. 37):

$$LL = ((p_{0,0} + p_{0,3} + q_{0,0} + q_{0,3}) \gg 2)/(1 \ll bitDepth) \quad (Eq. 37)$$

where, the sample values $p_{i,k}$ and $q_{i,k}$ with i=0.3 and k=0 and 3 are derived based on sample positions.

Figure 21:
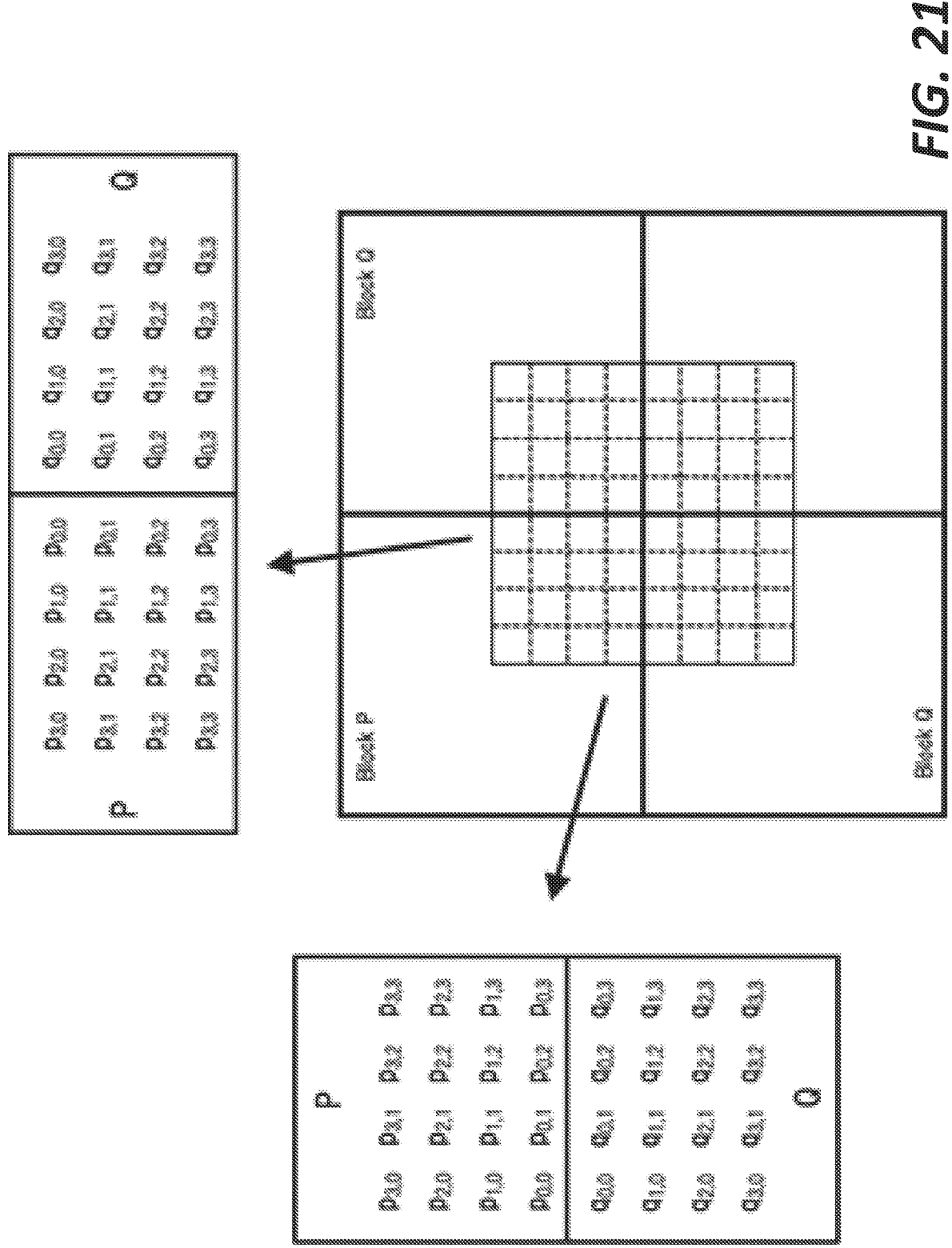
FIG. 21 shows an example of sample positions for deriving filter strength according to some embodiments of the disclosure.

FIG. 21 shows an example to derive $p_{i,k}$ and $q_{i,k}$ with i=0.3 and k=0 and 3.

horizontal boundary. Block boundary samples $p_i$ for i=0 to Sp-1 and $q_j$ for j=0 to Sq-1 are then replaced by linear interpolation as follows:

$$p_i' = (f_i \times Middle_{s,t} + (64 - f_i) \times P_s + 32) \gg 6), \text{ clipped to } p_i \pm tcPD_i \quad (Eq. 39)$$

$$q_j' = (g_j \times Middle_{s,t} + (64 - g_j) \times Q_s + 32) \gg 6), \text{ clipped to } q_j \pm tcPD_j \quad (Eq. 40)$$

where $tcPD_i$ and $tcPD_j$ term is a position dependent clipping and $g_j$, $f_i$, $Middle_{s,t}$, $P_s$ and $Q_s$ are given based on following Table 1:

TABLE 1

Derivation of Stronger Deblocking Parameters for Luma

| Sp, Sq | |
|---|---|
| 7, 7 (p side: 7, q side: 7) | $f_i = 59 - i \times 9$, can also be described as f = {59, 50, 41, 32, 23, 14, 5}<br>$g_j = 59 - j \times 9$, can also be described as g = {59, 50, 41, 32, 23, 14, 5}<br>$Middle_{7,7} = (2 \times (p_o + q_o) + p_1 + q_1 + p_2 + q_2 + p_3 + q_3 + p_4 + q_4 + p_5 + q_5 + p_6 + q_6) \gg 4$<br>$P_7 = (p_6 + p_7 + 1) \gg 1, Q_7 = (q_6 + q_7 + 1) \gg 1$ |
| 7, 3 (p side: 7 q side: 3) | $f_i = 59 - i \times 9$, can also be described as f = {59, 50, 41, 32, 23, 14, 5}<br>$g_j = 53 - j \times 21$, can also be described as g = {53, 32, 11}<br>$Middle_{7,3} = (2 \times (p_o + q_o) + q_0 + 2 \times (q_1 + q_2) + p_1 + q_1 + p_2 + p_3 + p_4 + p_5 + p_6 + 8) \gg 4$<br>$P_7 = (p_6 + p_7 + 1) \gg 1, Q_3 = (q_2 + q_3 + 1) \gg 1$ |
| 3, 7 (p side: 3 q side: 7) | $g_j = 59 - j \times 9$, can also be described as g = {59, 50, 41, 32, 23, 14, 5}<br>$f_i = 53 - i \times 21$, can also be described as f = {53, 32, 11}<br>$Middle_{3,7} = (2 \times (q_o + p_o) + p_0 + 2 \times (p_1 + p_2) + q_1 + p_1 + q_2 + q_3 + q_4 + q_5 + q_6 + 8) \gg 4$<br>$Q_7 = (q_6 + q_7 + 1) \gg 1, P_3 = (p_2 + p_1 + 1) \gg 1$ |
| 7, 5 (p side: 7 q side: 5) | $g_j = 58 - j \times 13$, can also be described as g = {58, 45, 32, 19, 6}<br>$f_i = 59 - i \times 9$, can also be described as f = {59, 50, 41, 32, 23, 14, 5}<br>$Middle_{7,5} = (2 \times (p_o + q_o + p_1 + q_1) + q_2 + p_2 + q_3 + p_3 + q_4 + p_4 + q_5 + p_5 + 8) \gg $<br>$Q_5 = (q_4 + q_5 + 1) \gg 1, P_7 = (p_6 + p_7 + 1) \gg 1$ |
| 5, 7 (p side: 5 q side: 7) | $g_j = 59 - j \times 9$, can also be described as g = {59, 50, 41, 32, 23, 14, 5}<br>$f_i = 58 - i \times 13$, can also be described as f = {58, 45, 32, 19, 6}<br>$Middle_{5,7} = (2 \times (q_o + p_o + p_1 + q_1) + q_2 + p_2 + q_3 + p_3 + q_4 + p_4 + q_5 + p_5 + 8) \gg $<br>$Q_7 = (q_6 + q_7 + 1) \gg 1, P_5 = (p_4 + p_5 + 1) \gg 1$ |
| 5, 5 (p side: 5 q side: 5) | $g_j = 58 - j \times 13$, can also be described as g = {58, 45, 32, 19, 6}<br>$f_i = 58 - i \times 13$, can also be described as f = {58, 45, 32, 19, 6}<br>$Middle_{5,5} = (2 \times (q_o + p_o + p_1 + q_1 + q_2 + p_2) + q_3 + p_3 + q_4 + p_4 + 8) \gg 4$<br>$Q_5 = (q_4 + q_5 + 1) \gg 1, P_5 = (p_4 + p_5 + 1) \gg 1$ |
| 5, 3 (p side: 5 q side: 3) | $g_j = 53 - j \times 21$, can also be described as g = {53, 32, 11}<br>$f_i = 58 - i \times 13$, can also be described as f = {58, 45, 32, 19, 6}<br>$Middle_{5,3} = (q_o + p_o + p_1 + q_1 + q_2 + p_2 + q_3 + p_3 + 4) \gg 3$<br>$Q_3 = (q_2 + q_3 + 1) \gg 1, P_5 = (p_4 + p_5 + 1) \gg 1$ |
| 3, 5 (p side: 3 q side: 5) | $g_j = 58 - j \times 13$, can also be described as g = {58, 45, 32, 19, 6}<br>$f_i = 53 - i \times 21$, can also be described as f = {53, 32, 11}<br>$Middle_{3,5} = (q_o + p_o + p_1 + q_1 + q_2 + p_2 + q_3 + p_3 + 4) \gg 3$<br>$Q_5 = (q_4 + q_5 + 1) \gg 1, P_3 = (p_2 + p_3 + 1) \gg 1$ |

In an example, the variable $qP_L$ is derived as (Eq. 38):

$$qP_L = ((Qp_Q + Qp_P + 1) \gg 1) + qpOffset \quad (Eq. 38)$$

where $Qp_Q$ and $Qp_P$ denote the quantization parameters of the coding units containing the sample $q_{0,0}$ and $p_{0,0}$, respectively. The offset qpOffset is dependent on transfer function, the values are signaled in the SPS.

In an embodiment, the deblocking tC table can be extended. For example, in VTM5, maximum QP can be changed from 51 to 63. The values of deblocking parameters tC are derived based on the block QP, thus accordingly the deblocking table is changed. Following is an updated tC table to accommodate the extension of the QP range:

tC=[0, 0, 0, 0, 0, 0, 0, 0, 0, 0, 0, 0, 0, 0, 0, 0, 0, 0,
1, 1, 1, 1, 1, 1, 1, 1, 1, 2, 2, 2, 2, 3, 3, 3, 3, 4,
4, 4, 5, 5, 6, 6, 7, 8, 9, 10, 11, 13, 14, 16, 18,
20, 22, 25, 28, 31, 35, 39, 44, 50, 56, 63, 70,
79, 88, 99]

In an embodiment, stronger deblocking filter for luma can be used. In some examples, a bilinear filter (stronger deblocking filter) is used when samples at either one side of a boundary belong to a large block. A sample belonging to a large block is defined as when the width of the block is larger than or equal to 32 for a vertical boundary, and when height of the block is larger than or equal to 32 for a In some embodiments, the above mentioned stronger luma filters are used only if all of three conditions (referred to as Condition1, Condition2 and Condition3) are TRUE. The Condition1 is a "large block condition". The Condition1 detects whether the samples at P-side and Q-side belong to large blocks. The Condition2 and Condition3 are determined by:

$$Condition2 = (d < \beta) ? \text{ TRUE: FALSE} \quad (Eq. 41)$$

Condition3=StrongFilterCondition=(dpq is less than ($\beta \gg 2$), $sp_3 + sq_3$ is less than ($3 \times \beta \gg 5$), and $Abs(p_0 - q_0)$ is less than ($5 \times t_C + 1) \gg 1$)?TRUE: FALSE (Eq. 42)

In an embodiment, strong deblocking filter is used for chroma. In an example, the strong deblocking filter for chroma can be defined as shown in (Eq. 42-Eq. 44)

$$p_2' = (3 \times p_3 + 2 \times p_2 + p_1 + p_0 + q_0 + 4) \gg 3 \quad (Eq. 42)$$

$$p_1' = (2 \times p_3 + p_2 + 2 \times p_1 + p_0 + q_0 + q_1 + 4) \gg 3 \quad (Eq. 43)$$

$$p_0' = (p_3 + p_2 + p_1 + 2 \times p_0 + q_0 + q_1 + q_2 + 4) \gg 3 \quad (Eq. 44)$$

The above chroma filter performs deblocking on a 8×8 chroma sample grid. The chroma strong filters are used on both sides of the block boundary. In an example, the chroma filter is selected when both sides of the chroma edge are greater than or equal to 8 (in unit of chroma sample), and the following decision with three conditions are satisfied. The first condition is for decision of boundary strength as well as large block. The second condition and third condition are basically the same as for HEVC luma decision, which are on/off decision and strong filter decision, respectively. In the first decision, boundary strength (bS) is modified for chroma filtering as shown in Table 2. The conditions in Table 2 are checked sequentially. If a condition is satisfied, then the remaining conditions with lower priorities can be skipped in some examples.

TABLE 2

The Modified Boundary Strength

| Priority | Conditions | Y | U | V |
|---|---|---|---|---|
| 5 | At least one of the adjacent blocks is intra | 2 | 2 | 2 |
| 4 | At least one of the adjacent blocks has non-zero transform coefficients | 1 | 1 | 1 |
| 3 | Absolute difference between the motion vectors that belong to the adjacent blocks is greater than or equal to one integer luma sample | 1 | N/A | N/A |
| 2 | Motion prediction in the adjacent blocks refers to vectors is different | 1 | N/A | N/A |
| 1 | Otherwise | 0 | 0 | 0 |

Chroma deblocking is performing when bS is equal to 2, or bS is equal to 1 when a large block boundary is detected. The second and third condition can be the same as HEVC luma strong filter decision.

In an embodiment, deblocking filter for sub block boundary is used. In some examples, deblocking filter is enabled on 4×4 grid for luma, and 8×8 grid for chroma. In some examples, deblocking filter is enabled on 8×8 grid for PU. In some embodiments, the deblocking filtering process is applied to the CU boundaries as well as the sub block boundaries. The sub block boundaries include the prediction unit boundaries introduced by STMVP and affine modes, and the transform unit boundaries introduced by SBT and ISP modes.

In some examples, for SBT and ISP sub blocks, the same logic in TU that is used in HEVC deblocking filter can be applied. The deblocking filter can be applied at TU boundary when there are non-zero coefficients in either sub block across the edge.

For SbTMVP and affine sub blocks on 4×4 grid, the same logic in PU that is used in HEVC deblocking filter is applied. For PU boundaries, the deblocking filter is applied with the consideration of the difference between motion vectors and reference pictures of the neighboring sub block.

According to an aspect of the disclosure, for BDOF and PROF, unified processes can be used to calculate gradient, MV differences, and the refinement. Thus, the architecture and hardware implementation for encoder and decoder can be simplified.

According to another aspect of the disclosure, certain tools that are not necessary can be skipped. In some examples, when affine PROF is applied, the motion vector refinement can achieve pixel level motion vector adjustment. Thus, after the refinement process, deblocking filter on reconstructed affine sub block edges is not necessary and can be skipped.

In some examples, sub block transform (SBT) may be not helpful when sub block based inter prediction is used, or when affine PROF is applied.

The proposed methods may be used separately or combined in any order. Further, each of the methods (or embodiments), encoder, and decoder may be implemented by processing circuitry (e.g., one or more processors or one or more integrated circuits). In one example, the one or more processors execute a program that is stored in a non-transitory computer-readable medium. In the following, the term block may be interpreted as a prediction block, a coding block, or a coding unit, i.e. CU.

In some embodiments, refinement processes (including parameters in the refinement processes) on BDOF and PROF can be unified. For example, the sub block size for PROF and BDOF can be unified. In an example, a unified sub block size may be used for both BDOF and affine PROF, and the unified sub block size can be denoted as N×M in luma samples, where N is the width of each sub block, M is the height of each sub block.

In an embodiment, the motion compensation is applied on sub block size of N×M for both BDOF and affine with PROF. In one example, N and M are both equal to 8 luma samples. In another example, N=8 and M=4. In another example, N=4 and M=8.

In another embodiment, the gradient calculation can be performed on sub block size of N×M with 1 additional sample padding on each edge of the block (e.g., additional one row padding beyond the upper edge and bottom edge, and additional one column padding beyond the left edge and the right edge) for both BDOF and Affine PROF. In an example, N and M are both equal to 8.

In another embodiment, the prediction refinement calculation is performed on each sub block size of N×M for both BDOF and affine PROF. In one example, N and M are both equal to 8, and compared with sub block size of 4×4, the complexity and computation can be reduced.

In some embodiments, unified per pixel MV refinement calculation can be used in both BDOF and affine PROF. In some related examples, while the affine PROF calculates MV refinement values for each pixel within the affine sub block; BDOF calculates MV refinement values for each 4×4 sub block. In an embodiment of the disclosure, MV refinement for BDOF can be calculated for each pixel.

Specifically, in an embodiment of BDOF calculation, correlation (per luma sample) may be calculated as $$t_1 = \Sigma_{[i,j]\in\Omega} \text{abs}(I_x^1 + I_x^0) \quad \text{(Eq. 45)}$$

$$t_2 = \Sigma_{[i,j]\in\Omega} \text{abs}(I_y^1 + I_y^0) \quad \text{(Eq. 46)}$$

$$t_3 = \Sigma_{[i,j]\in\Omega} (-\text{sign}(I_x^1 + I_x^0) \times (I^0 - I^1)) \quad \text{(Eq. 47)}$$

$$t_4 = \Sigma_{[i,j]\in\Omega} (-\text{sign}(I_y^1 + I_y^0) \times (I^0 - I^1)) \quad \text{(Eq. 48)}$$

$$t_5 = \Sigma_{[i,j]\in\Omega} \text{sign}(I_y^1 + I_y^0) \times (I_x^1 + I_x^0) \quad \text{(Eq. 49)}$$

where $I^0$, $I^1$ are the prediction image from motion compensation (MC) on reference L0 and L1; $I_x^0$, $I_x^1$, $I_y^0$, $I_y^1$ are the corresponding gradient images; $\Omega$ is the 3×3 area for each sample.

$$\text{sign}(Z) = \begin{cases} 1 & (Z > 0) \\ 0 & (Z = 0) \\ -1 & (Z < 0) \end{cases} \quad \text{(Eq. 50)}$$

Further, motion refinement are calculated as:

$$v_x = \frac{t3}{t1} \quad \text{(Eq. 51)}$$

$$v_y = \frac{t4 - v_x \times t5}{t2} \quad \text{(Eq. 52)}$$

Then, BDOF offset (per sample unit) can be calculated as:

$$\text{BDOFoffset} = (v_x \times (I_x^0 - I_x^1))/2 + (v_y \times (I_y^0 - I_y^1))/2 \quad \text{(Eq. 53)}$$

In some other embodiments, MV refinement for BDOF can be calculated for each sub block. In some examples, the sub block size for PROF refinement can be smaller than the sub block size for PROF motion compensation. For example, a sub block size of 2×2 is used for MV refinement and 4×4 sub block size for motion compensation for BDOF and PROF.

According to an aspect of the disclosure, deblocking techniques are modified when affine PROF is applied. Specifically, in some examples, in a coding block which is coded with affine inter prediction, when PROF is applied, the deblocking method along the edges of the affine sub blocks is modified. The modified deblocking method may be enabled by default, or to be signaled by a high-level syntax, such as at slice level, picture level, tile level, tile group level, etc. The usage of the modified deblocking method may also be signaled at block level.

In an embodiment, when Affine PROF is applied on a coding block, deblocking filter is disabled on the edges of all of the sub blocks of the coding block, except for those edges on the boundary of the coding block.

In another embodiment, when Affine PROF is applied on a coding block, deblocking filter strength is reduced by a value of S on the edges of all of the sub blocks of the coding block, except for those edges on the boundary of the coding block. In an example, the deblocking filter strength value is already smaller than S before the reduction, the strength value may be set to 0. In some examples, the value of S may be 1.

In another embodiment, when Affine PROF is applied on a coding block, deblocking boundary strength calculation that is based on the motion vector difference can be skipped for internal sub-block edges (edges other than the coding block boundaries). It is noted that the deblocking boundary strength calculation that is based on transform may still be performed.

In another embodiment, when Affine PROF is applied on a coding block, the deblocking, boundary strength calculation that is based on motion vector difference can be skipped for internal sub-block edges, except for the case that sub-block transform is enabled and the sub-block edge is at the sub-block transform block boundary.

In another embodiment, when Affine PROF is applied on a coding block, deblocking filter may be conditionally disabled on the edges of all of sub blocks of the coding block, except for those edges on the boundary of the coding block. In some embodiments, a threshold may be used to determine whether to apply deblocking filter on affine sub blocks.

In some examples, when the absolute difference between the horizontal or vertical component of the motion vectors used by the two sub blocks adjacent to an edge (referred to as sub block edge) is less than a threshold value, denoted as TH, deblocking filter is disabled on the sub block edge, or the boundary strength for the sub block edge is set to be 0.

In an example, TH may be set equal to 4 in units of quarter luma samples. In another example, TH may be set equal to 6 in units of quarter luma samples. In another example, TH may be set equal to 8 in units of quarter luma samples.

In another embodiment, the maximum absolute value of affine parameters of the affine model used for the coding block may be used to determine whether to disable deblocking filter on affine sub block edges or the deblocking Bs.

For example, the values of affine parameters can be calculated from control point motion vectors (CPMVs) and width/height of the affine block. In an example of 4-parameter affine, control point motion vectors for two control points are denoted as $\text{CPMV}_0(\text{MV}_{x0}, \text{MV}_{y0})$ and $\text{CPMV}_1(\text{MV}_{x1}, \text{MV}_{y1})$. Two parameters (e.g., slope parameters) a and b can be calculated as:

$$\begin{cases} a = \dfrac{MVx1 - MVx0}{W} \\ b = \dfrac{MVy1 - MVy0}{W} \end{cases} \quad \text{(Eq. 54)}$$

Similarly, in an example of 6-parameter affine, control point motion vectors for three control points are denoted as $\text{CPMV}_0(\text{MV}_{x0}, \text{MV}_{y0})$, $\text{CPMV}_1(\text{MV}_{x1}, \text{MV}_{y1})$, and $\text{CPMV}_2(\text{MV}_{x2}, \text{MV}_{y2})$. Four parameters (e.g., slope parameters) a, b, c and d can be calculated as:

$$\begin{cases} a = \dfrac{MVx1 - MVx0}{W} \\ b = \dfrac{MVx2 - MVx0}{H} \\ c = \dfrac{MVy1 - MVy0}{W} \\ d = \dfrac{MVy2 - MVy0}{H} \end{cases} \quad \text{(Eq. 55)}$$

In some examples, the maximum absolute value of affine parameter may be calculated as:

$$\text{maxParam} = \max\{|a|, |b|, |c|, |d|\} \quad \text{(Eq. 56)}$$

When maxParam is smaller than a threshold value the deblocking filter on sub block edges may be disabled. In an example, TH may be set equal to 8 in units of quarter lama samples. In another embodiment, when maxParam is larger than TH, deblocking Bs may be set to 1.

According to an aspect of the disclosure, conditional sub block transform for coding blocks with sub block based inter prediction can be performed. Under certain conditions, sub block transform for sub block inter prediction mode can be disabled. In an embodiment, when a block is coded with affine inter prediction, sub block transform may be disabled for the block. In another embodiment, when a block is coded with sub block based TMVP (SbTMVP), sub block transform may be disabled for the block. In another embodiment, when a block is coded with affine inter prediction, and PROF for affine is enabled, sub block transform may be disabled for the block. In another embodiment, when a block is coded with affine inter prediction, and sub block transform is used for the block, then PROF for affine is disabled.

Figure 22:
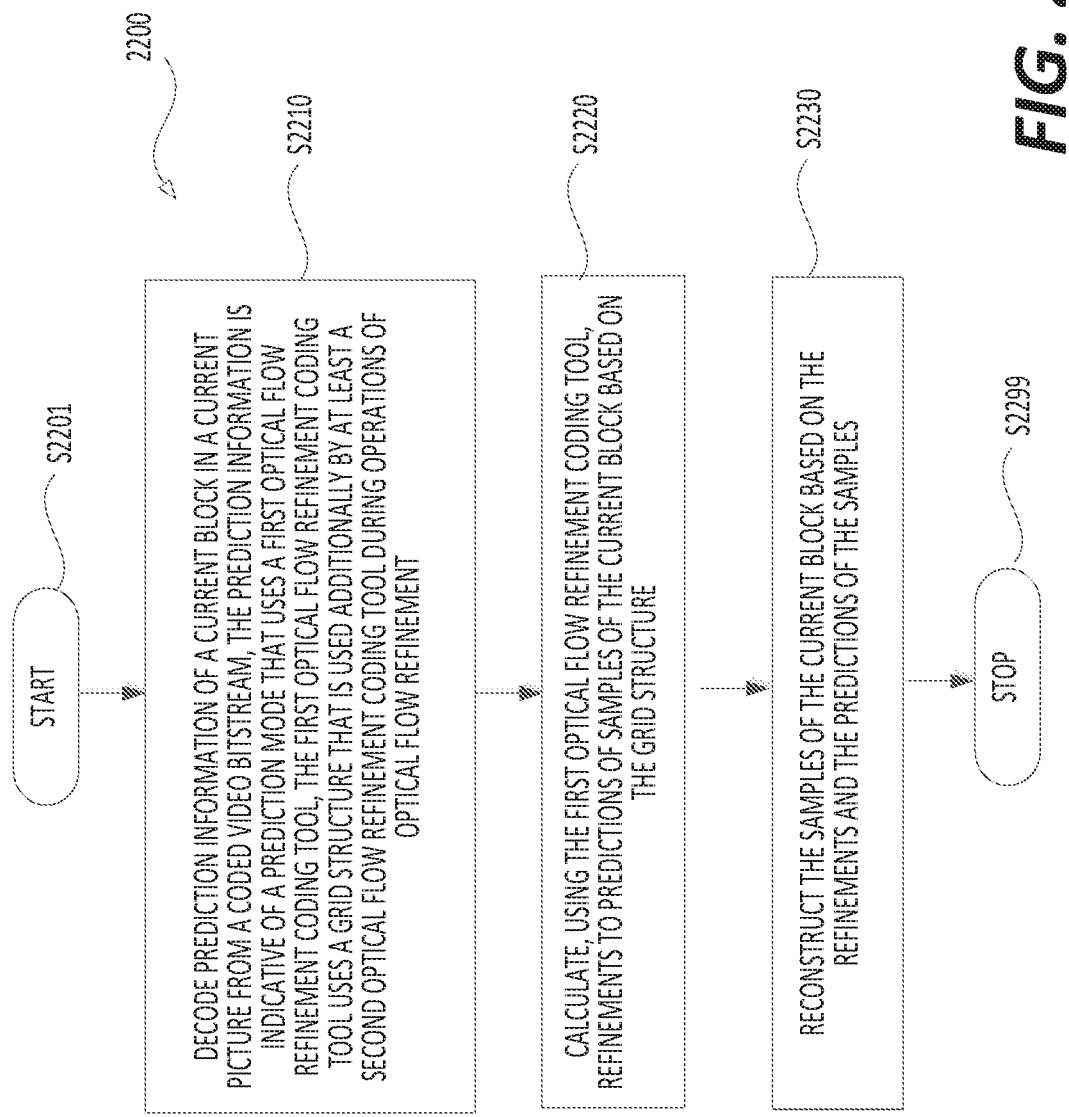
FIG. 22 shows a flow chart outlining a process example according to some embodiments of the disclosure.

FIG. 22 shows a flow chart outlining a process (2200) according to an embodiment of the disclosure. The process (2200) can be used in the reconstruction of a block, so to generate a prediction block for the block under reconstruction. In various embodiments, the process (2200) are executed by processing circuitry, such as the processing circuitry in the terminal devices (210), (220), (230) and (240), the processing circuitry that performs functions of the video encoder (303), the processing circuitry that performs functions of the video decoder (310), the processing circuitry that performs functions of the video decoder (410), the processing circuitry that performs functions of the video encoder (503), and the like. In some embodiments, the process (2200) is implemented in software instructions, thus when the processing circuitry executes the software instructions, the processing circuitry performs the process (2200). The process starts at (S2201) and proceeds to (S2210).

At (S2210), prediction information of a current block in a current picture is decoded from a coded video bitstream. The prediction information is indicative of a prediction mode that uses a first optical flow refinement coding tool. The first optical flow refinement coding tool uses a grid structure that is used additionally by at least a second optical flow refinement coding tool during operations of optical flow refinement.

In some embodiments, the first optical flow refinement coding tool is one of a bi-directional optical flow (BDOF) based coding tool and an affine prediction refinement with optical flow (PROF) based coding tool, and the second optical flow refinement coding tool is the other of the BDOF based coding tool and the affine PROF based coding tool.

At (S2220), refinements to predictions of samples of the current block are calculated based on the grid structure according to the first optical flow refinement coding tool.

In an embodiment, motion compensations are applied on sub blocks having a sub block size, and the first optical flow refinement coding tool and the second optical flow refinement coding tool use the sub block size as a unified grid for motion compensations.

In another embodiment, according to the first optical flow refinement coding tool, gradient calculations are performed on sub blocks having a sub block size, and the first optical flow refinement coding tool and the second optical flow refinement coding tool use the sub block size as a unified grid for gradient calculations.

In another embodiment, according to the first optical flow refinement coding tool, refinements to predictions of samples are calculated on each sub block having a sub block size, the first optical flow refinement coding tool and the second optical flow refinement coding tool use the sub block size as a unified grid for prediction refinement calculations.

In another embodiment, the first optical flow refinement coding tool and the second optical flow refinement coding tool calculate motion vector refinement per pixel.

At (S2230), the samples of the current block are reconstructed based on the refinements and the predictions of the samples. In some embodiments, deblocking filter may be suitably applied.

In some embodiments, the first optical flow refinement coding tool is an affine prediction refinement with optical flow (PROF) based coding tool, a strength of a deblocking filter for applying on at least an internal edge between sub blocks within the current block can be reduced. In an embodiment, the deblocking filter for applying on the internal edge between the sub blocks within the current block can be disabled.

In some embodiments, the deblocking filter is conditionally disabled. For example, an indictor parameter that is indicative of a motion vector difference on two sides of the internal edge can be compared to a threshold, deblocking filter is used or disabled based on the comparison result. In an example, an absolute difference between the horizontal or vertical components of the motion vectors used by the two sub blocks adjacent to the internal edge is compared to a threshold, and the deblocking filter is used or disabled based on the comparison result.

In another example, affine parameters can be compared with a threshold value. For example, a maximum value of the affine parameters is compared to a threshold value, and the deblocking filter is used or disabled based on the comparison result.

Then the process proceeds to (S2299) and terminates.

The techniques described above, can be implemented as computer software using computer-readable instructions and physically stored in one or more computer-readable media. For example, FIG. 23 shows a computer system (2300) suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by one or more computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 23:
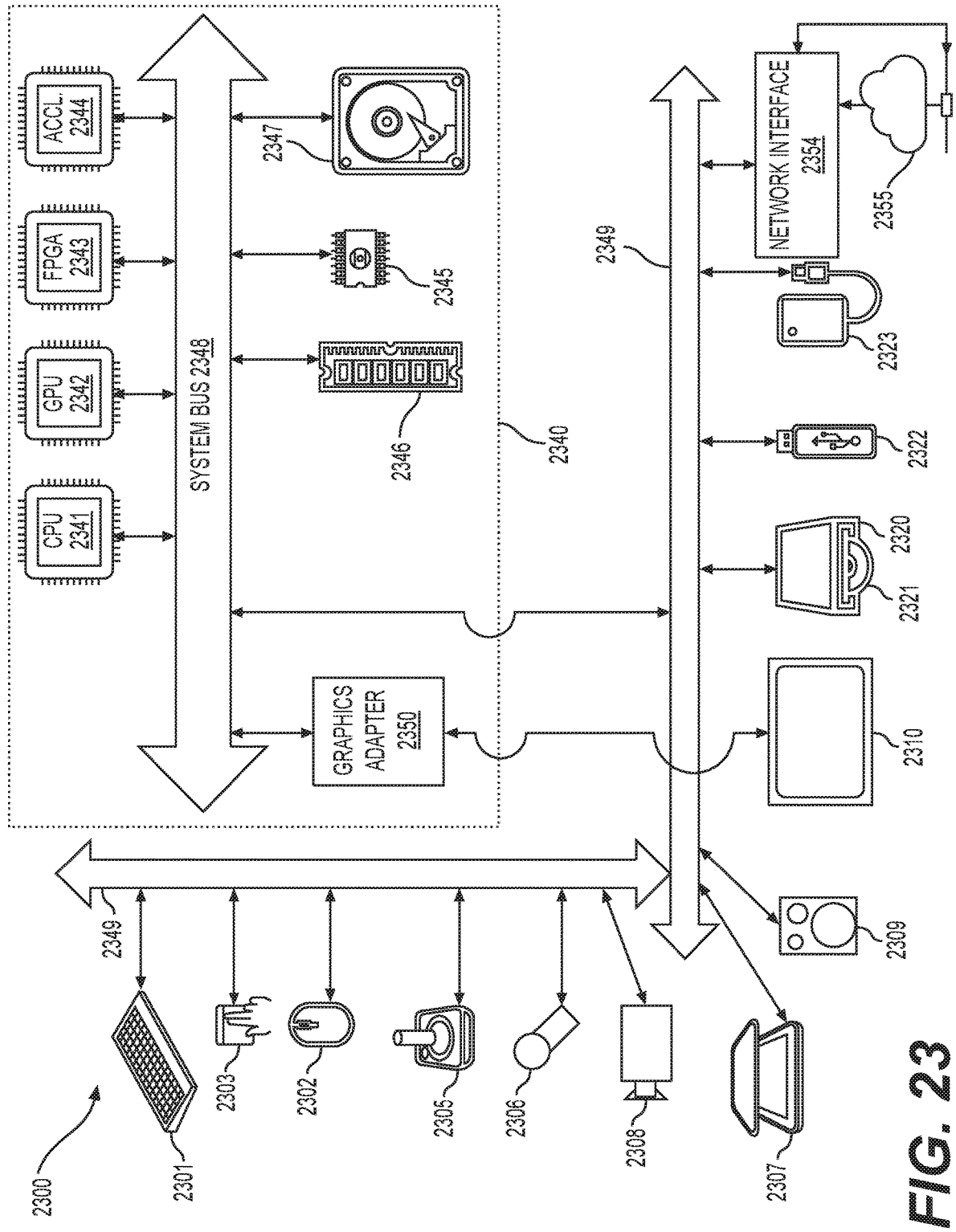
FIG. 23 is a schematic illustration of a computer system in accordance with an embodiment.

The components shown in FIG. 23 for computer system (2300) are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system (2300).

Computer system (2300) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (2301), mouse (2302), trackpad (2303), touch screen (2310), data-glove (not shown), joystick (2305), microphone (2306), scanner (2307), camera (2308).

Computer system (2300) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (2310), data-glove (not shown), or joystick (2305), but there can also be tactile feedback devices that do not serve as input devices), audio output devices (such as: speakers (2309), headphones (not depicted)), visual output devices (such as screens (2310) to include CRT screens, LCD screens, plasma screens, OLED screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

Computer system (2300) can also include human accessible storage devices and their associated media such as optical media including CD/DVD ROM/RW (2320) with CD/DVD or the like media (2321), thumb-drive (2322), removable hard drive or solid state drive (2323), legacy magnetic media such as tape and floppy disc (not depicted), specialized ROM/ASIC/PLD based devices such as security dangles (not depicted), and the like.

Those skilled in the art should also understand that term "computer readable media" as used in connection with the presently disclosed subject matter does not encompass transmission media, carrier waves, or other transitory signals.

Computer system (2300) can also include an interface to one or more communication networks. Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (2349) (such as, for example USB ports of the computer system (2300)); others are commonly integrated into the core of the computer system (2300) by attachment to a system bus as described below (for example Ethernet interface into a PC computer system or cellular network interface into a smartphone computer system). Using any of these networks, computer system (2300) can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core (2340) of the computer system (2300).

The core (2340) can include one or more Central Processing Units (CPU) (2341), Graphics Processing Units (GPU) (2342), specialized programmable processing units in the form of Field Programmable Gate Areas (FPGA) (2343), hardware accelerators for certain tasks (2344), and so forth. These devices, along with Read-only memory (ROM) (2345), Random-access memory (2346), internal mass storage such as internal non-user accessible hard drives, SSDs, and the like (2347), may be connected through a system bus (2348). In some computer systems, the system bus (2348) can be accessible in the form of one or more physical plugs to enable extensions by additional CPUs, GPU, and the like. The peripheral devices can be attached either directly to the core's system bus (2348), or through a peripheral bus (2349). Architectures for a peripheral bus include PCI, USB, and the like.

CPUs (2341), GPUs (2342), FPGAs (2343), and accelerators (2344) can execute certain instructions that, in combination, can make up the aforementioned computer code. That computer code can be stored in ROM (2345) or RAM (2346). Transitional data can be also be stored in RAM (2346), whereas permanent data can be stored for example, in the internal mass storage (2347). Fast storage and retrieve to any of the memory devices can be enabled through the use of cache memory, that can be closely associated with one or more CPU (2341), GPU (2342), mass storage (2347), ROM (2345), RAM (2346), and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture (2300), and specifically the core (2340) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (2340) that are of non-transitory nature, such as core-internal mass storage (2347) or ROM (2345). The software implementing various embodiments of the present disclosure can be stored in such devices and executed by core (2340). A computer-readable medium can include one or more memory devices or chips, according to particular needs. The software can cause the core (2340) and specifically the processors therein (including CPU, GPU, FPGA, and the like) to execute particular processes or particular parts of particular processes described herein, including defining data structures stored in RAM (2346) and modifying such data structures according to the processes defined by the software. In addition or as an alternative, the computer system can provide functionality as a result of logic hardwired or otherwise embodied in a circuit (for example: accelerator (2344)), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

APPENDIX A: ACRONYMS

JEM: joint exploration model
VVC: versatile video coding
BMS: benchmark set
MV: Motion Vector
HEVC: High Efficiency Video Coding
SEI: Supplementary Enhancement Information VUI: Video Usability Information
GOPs: Groups of Pictures
TUs: Transform Units,
PUs: Prediction Units
CTUs: Coding Tree Units
CTBs: Coding Tree Blocks
PBs: Prediction Blocks
HRD: Hypothetical Reference Decoder
SNR: Signal Noise Ratio
CPUs: Central Processing Units
GPUs: Graphics Processing Units
CRT: Cathode Ray Tube
LCD: Liquid-Crystal Display
OLED: Organic Light-Emitting Diode
CD: Compact Disc
DVD: Digital Video Disc
ROM: Read-Only Memory
RAM: Random Access Memory.
ASIC: Application-Specific Integrated Circuit
PLD: Programmable Logic Device
LAN: Local Area Network
GSM: Global System for Mobile communications
LTE: Long-Term Evolution
CANBus: Controller Area Network Bus
USB: Universal Serial Bus
PCL Peripheral Component Interconnect
FPGA: Field Programmable Gate Areas
SSD: solid-state drive
IC: Integrated Circuit
CU: Coding Unit While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method for video decoding in a decoder, comprising:
decoding, by a processor, prediction information of a current block in a current picture from a coded video bitstream, the prediction information being indicative of a prediction mode that uses a selected optical flow refinement coding tool from candidate tools implemented by the decoder including a bi-directional optical flow (BDOF) based coding tool and an affine prediction refinement with optical flow (PROF) based coding tool;
calculating, by the processor and using the selected optical flow refinement coding tool in units of sub-blocks of the current block, refinements to predictions of samples of the current block regardless of the selected optical flow refinement coding tool being the BDOF based coding tool or the PROF based coding tool, each sub-block of the sub-blocks having a unified sub-block size for the BDOF based coding tool and the PROF based coding tool; and
reconstructing, by the processor, the samples of the current block based on the refinements and the predictions of the samples.

2. The method of claim 1, further comprising:
applying, by the processor and according to the selected optical flow refinement coding tool, a motion compensation on each sub-block of the sub-blocks of the current block regardless of the selected optical flow refinement coding tool being the BDOF based coding tool or the PROF based coding tool.

3. The method of claim 1, further comprising:
calculating, by the processor and according to the selected optical flow refinement coding tool, a respective gradient for each sub-block of the sub-blocks of the current block regardless of the selected optical flow refinement coding tool being the BDOF based coding tool or the PROF based coding tool.

4. The method of claim 1, further comprising:
calculating, by the processor and according to the selected optical flow refinement coding tool, a respective motion vector refinement for each sub-block of the sub-blocks of the current block regardless of the selected optical flow refinement coding tool being the BDOF based coding tool or the PROF based coding tool.

5. The method of claim 1, wherein
the selected optical flow refinement coding tool is the PROF based coding tool, and
the method further comprises:
applying a deblocking filter according to a first boundary strength on an edge of the current block; and
applying the deblocking filter according to a second boundary strength less than the first boundary strength on at least an internal edge between the sub-blocks within the current block.

6. The method of claim 1, wherein the selected optical flow refinement coding tool is the PROF based coding tool, and the method further comprises:
applying a deblocking filter on an edge of the current block; and
disabling application of the deblocking filter on internal edges between the sub-blocks within the current block.

7. The method of claim 1, further comprising:
the selected optical flow refinement coding tool is the PROF based coding tool, and
the method further comprises:
applying a deblocking filter on an edge of the current block;
comparing a motion vector difference on two sides of an internal edge between two of the sub-blocks within the current block with a threshold value; and
disabling application of the deblocking filter on the internal edge in response to the motion vector difference being less than the threshold value.

8. The method of claim 1, wherein
the selected optical flow refinement coding tool is the PROF based coding tool, and
the method further comprises:
applying a deblocking filter on an edge of the current block;
comparing a maximum motion vector difference of internal edges between the sub-blocks within the current block with a threshold value; and
disabling application of the deblocking filter on the internal edges in response to the maximum motion vector difference being less than the threshold value.

9. An apparatus for video decoding, comprising:
processing circuitry configured to:
decode prediction information of a current block in a current picture from a coded video bitstream, the prediction information being indicative of a prediction mode that uses a selected optical flow refinement coding tool from candidate tools implemented by the decoder including a bi-directional optical flow (BDOF) based coding tool and an affine prediction refinement with optical flow (PROF) based coding tool;

calculate, using the selected optical flow refinement coding tool in units of sub-blocks of the current block, refinements to predictions of samples of the current block regardless of the selected optical flow refinement coding tool being the BDOF based coding tool or the PROF based coding tool, each sub-block of the sub-blocks having a unified sub-block size for the BDOF based coding tool and the PROF based coding tool; and reconstruct the samples of the current block based on the refinements and the predictions of the samples.

10. The apparatus of claim 9, wherein the processing circuitry is further configured to:

apply, according to the selected optical flow refinement coding tool, a motion compensation on each sub-block of the sub-blocks of the current block regardless of the selected optical flow refinement coding tool being the BDOF based coding tool or the PROF based coding tool.

11. The apparatus of claim 9, wherein the processing circuitry is further configured to:

calculate, according to the selected optical flow refinement coding tool, a respective gradient for each sub-block of the sub-blocks of the current block regardless of the selected optical flow refinement coding tool being the BDOF based coding tool or the PROF based coding tool.

12. The apparatus of claim 9, wherein the processing circuitry is further configured to:

calculate, according to the selected optical flow refinement coding tool, a respective motion vector refinement for each sub-block of the sub-blocks of the current block regardless of the selected optical flow refinement coding tool being the BDOF based coding tool or the PROF based coding tool.

13. The apparatus of claim 9, wherein the selected optical flow refinement coding tool is the PROF based coding tool, and the processing circuitry is further configured to:

apply a deblocking filter according to a first boundary strength on an edge of the current block; and apply the deblocking filter according to a second boundary strength less than the first boundary strength on at least an internal edge between the sub-blocks within the current block.

14. The apparatus of claim 9, wherein the selected optical flow refinement coding tool is the PROF based coding tool, and the processing circuitry is further configured to:

apply a deblocking filter on an edge of the current block; and disable application of the deblocking filter on internal edges between the sub-blocks within the current block.

15. The apparatus of claim 9, wherein the selected optical flow refinement coding tool is the PROF based coding tool, and the processing circuitry is further configured to:

apply a deblocking filter on an edge of the current block;

compare a motion vector difference on two sides of an internal edge between two of the sub-blocks within the current block with a threshold value; and disable application of the deblocking filter on the internal edge in response to the motion vector difference being less than the threshold value.

16. A non-transitory computer-readable medium storing instructions which when executed by a computer for video decoding cause the computer to perform:

decoding prediction information of a current block in a current picture from a coded video bitstream, the prediction information being indicative of a prediction mode that uses a selected optical flow refinement coding tool from candidate tools implemented by the computer including a bi-directional optical flow (BDOF) based coding tool and an affine prediction refinement with optical flow (PROF) based coding tool;

calculating, using the selected optical flow refinement coding tool in units of sub-blocks of the current block, refinements to predictions of samples of the current block regardless of the selected optical flow refinement coding tool being the BDOF based coding tool or the PROF based coding tool, each sub-block of the sub-blocks having a unified sub-block for the BDOF based coding tool and the PROF based coding tool; and reconstructing the samples of the current block based on the refinements and the predictions of the samples.

17. The non-transitory computer-readable medium of claim 16, wherein the instructions when executed by the computer further cause the computer to perform:

applying, according to the selected optical flow refinement coding tool, a motion compensation on each sub-block of the sub-blocks of the current block regardless of the selected optical flow refinement coding tool being the BDOF based coding tool or the PROF based coding tool.

18. The non-transitory computer-readable medium of claim 16, wherein the instructions when executed by the computer further cause the computer to perform:

calculating, according to the selected optical flow refinement coding tool, a respective gradient for each sub-block of the sub-blocks of the current block regardless of the selected optical flow refinement coding tool being the BDOF based coding tool or the PROF based coding tool.

19. The non-transitory computer-readable medium of claim 16, wherein the instructions when executed by the computer further cause the computer to perform:

calculating, according to the selected optical flow refinement coding tool, a respective motion vector refinement for each sub-block of the sub-blocks of the current block regardless of the selected optical flow refinement coding tool being the BDOF based coding tool or the PROF based coding tool.

20. The apparatus of claim 9, wherein the selected optical flow refinement coding tool is the PROF based coding tool, and the processing circuitry is further configured to:

apply a deblocking filter on an edge of the current block;

compare a maximum motion vector difference of internal edges between the sub-blocks within the current block with a threshold value; and disable application of the deblocking filter on the internal edges in response to the maximum motion vector difference being less than the threshold value.

* * * * *